US007363290B1

(12) United States Patent
Daniel, Jr. et al.

(10) Patent No.: US 7,363,290 B1
(45) Date of Patent: Apr. 22, 2008

(54) ITEM CAPTURE RESEARCH SYSTEM

(75) Inventors: Douglas G. Daniel, Jr., Lewisville, NC (US); Terry H. Beck, Advance, NC (US)

(73) Assignee: Wachovia Corporation, Charlotte, NC (US)

( * ) Notice: Subject to any disclaimer, the term of this patent is extended or adjusted under 35 U.S.C. 154(b) by 137 days.

(21) Appl. No.: 09/835,791

(22) Filed: Apr. 16, 2001

Related U.S. Application Data

(60) Provisional application No. 60/197,784, filed on Apr. 14, 2000.

(51) Int. Cl.
*G06F 17/30* (2006.01)

(52) U.S. Cl. ........................................... 707/3; 707/10

(58) Field of Classification Search ................ 707/204, 707/202, 10, 100, 102, 101; 382/305, 309; 705/70, 41
See application file for complete search history.

(56) References Cited

U.S. PATENT DOCUMENTS 5,287,497 A 2/1994 Behera ....................... 395/600
5,301,350 A 4/1994 Rogan et al. ............... 395/800
5,321,831 A 6/1994 Hirose ........................ 395/600
5,359,667 A 10/1994 Borowski et al. .............. 382/7
5,506,691 A 4/1996 Bednar et al. .............. 358/402
5,586,262 A 12/1996 Komatsu et al. ....... 395/200.02
5,602,936 A 2/1997 Green et al. ................ 382/140
5,678,046 A * 10/1997 Cahill et al. ................ 707/200
5,706,442 A 1/1998 Anderson et al. ........... 395/227
5,784,610 A * 7/1998 Copeland et al. ............. 707/10
5,812,983 A 9/1998 Kumagai ....................... 705/3
5,819,236 A * 10/1998 Josephson .................... 705/35
5,825,506 A 10/1998 Bednar et al. .............. 358/402
5,826,250 A 10/1998 Trefler ......................... 706/50
5,842,200 A 11/1998 Agrawal et al. ............... 707/1
5,845,253 A 12/1998 Rensimer et al. .............. 705/2
5,870,725 A * 2/1999 Bellinger et al. ............. 705/45
5,870,733 A 2/1999 Bass et al. ...................... 707/2
5,876,926 A 3/1999 Beecham ....................... 435/5
5,890,129 A 3/1999 Spurgeon ....................... 705/4
5,893,087 A 4/1999 Wlaschin et al. .............. 707/3

(Continued)

OTHER PUBLICATIONS

He et al. Research on online detecting recording and analyzing of substation communication information, Power System Technology, 2006, PowerCon, pp. 1-6, Oct. 2006.*

(Continued)

*Primary Examiner*—John Breene
*Assistant Examiner*—Baoquoc N. To
(74) *Attorney, Agent, or Firm*—Womble Carlyle Sandridge & Rice, PLLC

(57) ABSTRACT

An item capture research system having an item capture subsystem, a transaction data archive subsystem, an image data archive subsystem and a research engine. The item capture subsystem captures and stores transaction data and image data for items, such as checks. The transaction data subsystem has multiple data structures for the storage and retrieval of transaction data information, including, an on-us items data structure, a transit items data structure and an all items data structure. Each such data structure includes an online index to an offline archive file. The image data archive subsystem includes image databases for on-us item images, transit item images and white paper images. An online index to the offline image data is provided for. A research engine provides for efficient search and retrieval of image data and transaction data.

258 Claims, 33 Drawing Sheets

U.S. PATENT DOCUMENTS

| | | | | |
|---|---|---|---|---|
| 6,023,705 | A * | 2/2000 | Bellinger et al. | 707/200 |
| 6,115,509 | A * | 9/2000 | Yeskel | 382/309 |
| 6,661,910 | B2 * | 12/2003 | Jones et al. | 382/135 |
| 2003/0208421 | A1 * | 11/2003 | Vicknair et al. | 705/35 |

OTHER PUBLICATIONS

Park et al. Applying collaborative filtering to movie search for better ranking and browsing, Conference Knowledge Discovery in Data, Proceedings of the 13th ACM SIGKDD International conference on Knowledge discovery and data mining, pp. 550-559, 2007.*

* cited by examiner

```
01   AEMF-RECORD.
     05   AEMF-KEY.
          10   AEMF-KEY-APPL-SITE                      PIC     X(03).
               88   AEMF-KEY-APPL-SITE-CHR             VALUE 'CHR'.
               88   AEMF-KEY-APPL-SITE-CVL             VALUE 'CVL'.
               88   AEMF-KEY-APPL-SITE-RAL             VALUE 'RAL'.
               88   AEMF-KEY-APPL-SITE-COL             VALUE 'COL'.
               88   AEMF-KEY-APPL-SITE-ATL             VALUE 'ATL'.
          10   AEMF-KEY-APPL-DATE.
               20   AEMF-KEY-APPL-DATE-YYYY            PIC     X(02).
               20   AEMF-KEY-APPL-DATE-MM              PIC     X(01).
               20   AEMF-KEY-APPL-DATE-DD              PIC     X(01).
          10   AEMF-KEY-CAPT-SORT                      PIC     X(01).
          10   AEMF-KEY-CAPT-ENTRY-NUMB                PIC     X(02).
          10   AEMF-KET-RECD-NUMB                      PIC     X(03)   COMP-3.
     05   AEMF-ENTRY-DATA.
          10   AEMF-ENTRY-CAPT-DATE.
               20   AEMF-ENTRY-CAPT-DATE-YYYY          PIC     X(02).
               20   AEMF-ENTRY-CAPT-DATE-MM            PIC     X(01).
               20   AEMF-ENTRY-CAPT-DATE-DD            PIC     X(01).
          10   AEMF-ENTRY-CAPT-CYCLE                   PIC     X(01).
          10   AEMF-ENTRY-LOW-SEQU                     PIC     X(06).
          10   AEMF-ENTRY-HGH-SEQU                     PIC     X(06).
          10   AEMF-ENTRY-PASS-NUM                     PIC     X(01).
          10   AEMF-ENTRY-STR-TYPE                     PIC     X(01).
          10   AEMF-ENTRY-SUBSET-ID                    PIC     X(03).
          10   AEMF-ENTRY-NUMB-BLOCKS                  PIC     9(07)   COMP-3.
          10   AEMF-ENTRY-NUMB-BATCHS                  PIC     9(07)   COMP-3.
          10   AEMF-ENTRY-NUMB-ITEMS                   PIC     9(07)   COMP-3.
          10   FILLER                                  PIC     X(10).
     05   AEMF-BLOCK-DATA OCCURS 0 TO 20 TIMES DEPENDING ON
          AEMF-ENTRY-NUMB-BLOCKS.
          10   AEMF-BLOCK-SEQU-NUMB                    PIC     X(06).
          10   AEMF-BLOCK-AMOUNT                       PIC     X(05).
          10   AEMF-BLOCK-CAS-TYPE                     PIC     X(02).
          10   AEMF-BLOCK-TRACER-RT                    PIC     X(04).
          10   AEMF-BLOCK-TRACER-ACCT                  PIC     X(07).
          10   AEMF-BLOCK-NUMB-ITEMS                   PIC     9(06).   COMP-3.
          10   AEMF-BLOCK-AMOUNT-STATUS                PIC     X(01).
               88   AEMF-BLOCK-AMOUNT-RECD-INBAL       VALUE 'I'.
               88   AEMF-BLOCK-AMOUNT-RECD-OUTBAL      VALUE 'O'.

          10   FILLER                                  PIC     X(09).

     05   AEMF-BATCH-DATA OCCURS 0 TO 1000 TIMES DEPENDING ON
          AEMF-ENTRY-NUMB-BATCHS.
          10   AEMF-BATCH-BLOCK-SEQU-NUMB              PIC     X(06).
          10   AEMF-BATCH-SEQU-NUMB                    PIC     X(06).
          10   AEMF-BATCH-AMOUNT                       PIC     X(05).
          10   AEMF-BATCH-NUMB-ITEMS                   PIC     9(06)   COMP-3.
          10   AEMF-BATCH-AMOUNT-STATUS                PIC     X(01).
               88   AEMF-BATCH-AMOUNT-RECD-INBAL       VALUE 'I'.
               88   AEMF-BATCH-AMOUNT-RECD-OUTBAL      VALUE 'O'.
          10   FILLER                                  PIC     X(09).
```

FIG. 6

AEMF - All Entries Master File

| AEMF Key | Sequ Number Range | Data Records |
| --- | --- | --- |
| ATL 19980102 76 9998 001 String Header | 76000008 76000219 | 76000008 Block Ticket<br>76000011 Batch Ticket |
| ATL 19980102 77 9999 001 String Header | 77000220 77000330 | 77000220 Block Ticket<br>77000223 Batch Ticket |

FIG. 7

```
05  AIMF-KEY.
    10  AIMF-KEY-APPL-SITE                   PIC      X(03).
        88  AIMF-KEY-APPL-SITE-CHR           VALUE 'CHR'.
        88  AIMF-KEY-APPL-SITE-CVL           VALUE 'CVL'.
        88  AIMF-KEY-APPL-SITE-RAL           VALUE 'RAL'.
        88  AIMF-KEY-APPL-SITE-COL           VALUE 'COL'.
        88  AIMF-KEY-APPL-SITE-ATL           VALUE 'ATL'.
    10  AIMF-KEY-APPL-DATE.
        20  AIMF-KEY-APPL-DATE-YYYY          PIC      X(02).
        20  AIMF-KEY-APPL-DATE-MM            PIC      X(01).
        20  AIMF-KEY-APPL-DATE-DD            PIC      X(01).
    10  AIMF-KEY-ENTRY                       PIC      X(02).
    10  AIMF-KEY-LAST-SEQU.
        20  AIMF-KEY-LAST-SEQU-PRFX          PIC      X(01).
        20  AIMF-KEY-LAST-SEQU-SORT          PIC      X(01).
        20  AIMF-KEY-LAST-SEQU-NUMB          PIC      X(04).
    10  AIMF-KEY-RECD-NUMB                   PIC      9(05)   COMP-3.
    10  AIMF-KEY-RECD-TYPE                   PIC      X(01).
        88  AIMF-KEY-RECD-CONT               VALUE 'C'.
        88  AIMF-KEY-RECD-END                VALUE ' '.
05  AIMF-BATCH-DATA.
    10  AIMF-BATCH-CAPT-DATE-YYYYMMDD,
        20  AIMF-BATCH-CAPT-DATE-YYYY        PIC      X(02).
        20  AIMF-BATCH-CAPT-DATE-MM          PIC      X(01).
        20  AIMF-BATCH-CAPT-DATE-DD          PIC      X(01).
    10  AIMF-BATCH-CAPT-CYCLE                PIC      X(01).
    10  AIMF-BATCH-NUMB-ITEMS                PIC      9(07)   COMP-3.
05  AIMF-ITEM-DATA.
    10  AIMF-ITEM
        OCCURS 0 to 350
        DEPENDING ON AIMF-BATCH-NUMB-ITEMS.
        15  AIMF-ITEM-REC-SEQUENCE           PIC      X(06).
        15  AIMF-ITEM-REC-SERIAL             PIC      X(05).
        15  AIMF-ITEM-REC-TRAN-TYPE          PIC      X(02).
            88  AIMF-ITEM-TRAN-ONUS-BLOCK    VALUE X'80F5'
                                                   X'82F5'
                                                   X'C0F5'.
            88  AIMF-ITEM-TRAN-ONUS-BATCH    VALUE X'80F4'
                                                   X'82F4'
                                                   X'88F4'
                                                   X'C0F4'.
            88  AIMF-ITEM-TRAN-ONUS-CR       VALUE X'1400'
                                                   X'1C00'.
            88  AIMF-ITEM-TRAN-ONUS-BTEC-CR  VALUE X'1600'
                                                   X'1E00'.
            88  AIMF-ITEM-TRAN-ONUS-DB       VALUE X'1000'
                                                   X'1800'
                                                   X'5000'.
            88  AIMF-ITEM-TRAN-ONUS-BTEC-DB  VALUE X'1200'
                                                   X'1A00'.
            88  AIMF-ITEM-TRAN-TRAN-DB       VALUE X'0000'
                                                   X'0800'
                                                   X'2000'
                                                   X'4000'.
            88  AIMF-ITEM-TRAN-TRAN-BTEC-DB  VALUE X'0200'
                                                   X'0A00'
                                                   X'2200'
                                                   X'2A00'.
        15  AIMF-ITEM-RT                     PIC      X(04).
        15  AIMF-ITEM-ACCT                   PIC      X(07).
        15  AIMF-ITEM-PC                     PIC      X(03).
        15  AIMF-ITEM-AMT                    PIC      X(05).
        15  AIMF-ITEM-CPUID                  PIC      X(02).
        15  AIMF-ITEM-CPCS-TYPE              PIC      X(01).
        15  AIMF-ITEM-USER                   PIC      X(01).
        15  AIMF-ITEM-POCKET                 PIC      X(01).
        15  AIMF-ITEM-CR-RT                  PIC      X(04).
        15  AIMF-ITEM-CR-ACCT                PIC      X(07).
        15  AIMF-ITEM-CR-SEQU                PIC      X(06).
        15  AIMF-ITEM-AMT-STATUS             PIC      X(01).
            88  AIMF-ITEM-AMT-OK             VALUE ' '.
        15  FILLER                           PIC      X(05).
        15  AIMF-ITEM-DATA-TYPE              PIC      X(01).
            88  AIMF-ITEM-NUMB-NONE          VALUE ' '.
            88  AIMF-ITEM-NUMB-ONUS          VALUE 'O'.
            88  AIMF-ITEM-NUMB-TRANSIT       VALUE 'T'.
        15  AIMF-ITEM-NUMB-DATA              PIC      X(23).
        15  AIMF-ITEM-ONUS-DATA REDEFINES
            AIMF-ITEM-NUMB-DATA.
            20  AIMF-ONUS-POST-ACCT          PIC      9(15)      COMP-3.
            20  AIMF-ONUS-EXTR-ACCT          PIC      9(15)      COMP-3.
            20  FILLER                       PIC      X(07).
        15  AIMF-ITEM-TRANSIT-DATA REDEFINES
            AIMF-ITEM-NUMB-DATA.
            20  AIMF-TRANS-BUNDLE-DATE       PIC      X(04).
            20  AIMF-TRANS-BUNDLE-TIME       PIC      X(08).
            20  AIMF-TRANS-BUNDLE-AMT        PIC      9(09)V99   COMP-3.
            20  AIMF-TRANS-BUNDLE-ENDPT      PIC      9(09)      COMP-3.
```

FIG. 8

AIMF - All Items Master File

AIMF Object Records

| | | | | | | | | |
|---|---|---|---|---|---|---|---|---|
| ATL | 19980102 | 9998 | 19980102 | 0076000011 | 01 ' ' | | | |
| | 76000008 | Block Ticket | 76000008 | Batch Ticket | 76000013 | On-Us Credit | 76000014 | On-Us Debit |
| | ... | | 76000214 | On-Us Debit | 76000215 | Transit Debit | | |
| | 76000216 | On-Us Credit | 76000217 | Transit Debit | 76000218 | On-Us Debit | | |
| ATL | 19980102 | 9999 | 19980102 | 0076000223 | 01 ' ' | | | |
| | 77000220 | Block Ticket | 77000223 | Batch Ticket | 77000225 | On-Us Credit | 77000226 | On-Us Debit |
| | 77000227 | Transit Debit | .. | | 77000327 | Transit Debit | | |
| | 77000328 | On-Us Credit | 77000329 | Transit Debit | 77000330 | On-Us Debit | | |

FIG. 9

```
01    CLMF-RECORD.
      05    CLMF-KEY.
            10    CLMF-KEY-CL-PROC-SITE                  PIC     X(03).
            10    CLMF-KEY-CL-PROC-DATE                  PIC     9(09)     COMP-3.
            10    CLMF-KEY-CL-END-POINT                  PIC     9(09)     COMP-3.
            10    CLMF-KEY-CL-AMNT                       PIC     9(13)V99  COMP-3.

            10    CLMF-KEY-CL-TIME                       PIC     9(07)     COMP-3.
      05    CLMF-DATA.
            10    CLMF-KEY-SYST-DATE                     PIC     9(09)     COMP-3.
            10    CLMF-KEY-ACLS-NUMB                     PIC     9(03)     COMP-3.
            10    CLMF-CL-ABA-NUMBER                     PIC     9(09)     COMP-3.
            10    CLMF-CL-DUE-FROM-ACCT                  PIC     9(15)     COMP-3.
            10    CLMF-CL-NUMBER-BUNDLES                 PIC     9(05)     COMP-3.
            10    CLMF-CL-NUMBER-ITEMS                   PIC     9(09)     COMP-3.
            10    CLMF-CL-AVAIL-CODE                     PIC     X(01).
            10    CLMF-CL-AVAIL-DATE                     PIC     9(09)     CMOP-3.
            10    FILLER                                 PIC     X(14).
      05    CLMF-CL-BUNDLE-DATA OCCURS 0 TO 400 TIMES DEPENDING ON
            CLMF-CL-NUMBER-BUNDLES.
            10    CLMF-BUNDLE-AMNT                       PIC     9(13)V99  COMP-3.
            10    CLMF-BUNDLE-CPCS-NUMB                  PIC     9(03)     COMP-3.
            10    CLMF-BUNDLE-ACLS-NUMB                  PIC     9(03)     COMP-3.
            10    CLMF-BUNDLE-NUMB-ITEM                  PIC     9(07)     COMP-3.
            10    CLMF-BUNDLE-HOLD-OVER                  PIC     X(01).
```

FIG. 10

CLMF - Cash Letter Master File

| CLMF Key | | | | | Data Records |
|---|---|---|---|---|---|
| ATL | 19980102 | 12345678 | 99,999,999.99 | hhmmss | 99,999,999,999.99<br>99,999,999,999.99 |
| ATL | 19980102 | 12345678 | 99,999,999.99 | hhmmss | 99,999,999,999.99<br>99,999,999,999.99 |

FIG. 11

```
01  BIMF-RECORD.
    05  BIMF-KEY.
        10  BIMF-VSM-KEY-APPL-SITE                PIC    X(03).
            88  BIMF-VSM-KEY-APPL-SITE-CHR        VALUE 'CHR'.
            88  BIMF-VSM-KEY-APPL-SITE-CVL        VALUE 'CVL'.
            88  BIMF-VSM-KEY-APPL-SITE-RAL        VALUE 'RAL'.
            88  BIMF-VSM-KEY-APPL-SITE-COL        VALUE 'COL'.
            88  BIMF-VSM-KEY-APPL-SITE-ATL        VALUE 'ATL'.
        10  BIMF-VSM-KEY-APPL-DATE.
            20  BIMF-VSM-KEY-APPL-DATE-YYYY       PIC    X(02).
            20  BIMF-VSM-KEY-APPL-DATE-MM         PIC    X(01).
            20  BIMF-VSM-KEY-APPL-DATE-DD         PIC    X(01).
        10  BIMF-VSM-KEY-END-POINT                PIC    9(08)
        10  BIMF-VSM-KEY-BUNDLE-AMNT              PIC    9(13)V9
        10  BIMF-VSM-KEY-BUNDLE-TIME              PIC    9(07)
        10  BIMF-VSM-KEY-INT-SEQ-NUMB             PIC    9(05)
        10  BIMF-VSM-KEY-RECD-NUMB                PIC    9(05)
        10  BIMF-VSM-KEY-RECD-TYPE                PIC    X(01).
            88  BIMF-VSM-KEY-RECD-CONT            VALUE 'C'.
            88  BIMF-VSM-KEY-RECD-END             VALUE ' '.
    05  BIMF-RECORD-DATA.
        10  BIMF-VSM-BUNDLE-MCRE-SEQ              PIC    X(02).
        10  BIMF-VSM-BUNDLE-NUMB-ITEMS            PIC    9(07)
        10  BIMF-VSM-RECORD-ITEMS                 PIC    9(07)
        10  BIMF-VSM-ENTRY                        PIC    X(02).
        10  BIMF-VSM-ITEM-CYCLE                   PIC    X(01).
        10  BIMF-VSM-PASS                         PIC    X(01).
        10  BIMF-VSM-PASS-POCKET                  PIC    X(04).
        10  BIMF-VSM-STRING-TYPE                  PIC    X(01).
        10  BIMF-VSM-SUBSET-ID                    PIC    X(03).
        10  FILLER                                PIC    X(10).
    05  BIMF-VSM-ITEM-DATA.
        10  BIMF-VSM-ITEM-DATA OCCURS 0 TO 550 TIMES
                     DEPENDING ON BIMF-VSM-RECORD-ITEMS.
            15  BIMF-VSM-REC-ITEM-TRAN-TYPE       PIC    X(02).
            15  BIMF-VSM-REC-ITEM-SEQUENCE        PIC    X(06).
            15  BIMF-VSM-REC-ITEM-SERIAL          PIC    X(05).
            15  BIMF-VSM-REC-ITME-RETURN          PIC    X(01)
            15  BIMF-VSM-REC-ITEM-RT              PIC    X(04).
            15  BIMF-VSM-REC-ITEM-ACCT            PIC    X(07).
            15  BIMF-VSM-REC-ITEM-PC              PIC    X(03).
            15  BIMF-VSM-REC-ITEM-AMT             PIC    X(05).
            15  BIMF-VSM-REC-ITEM-BUNDLE-SEQU     PIC    X(02).
            15  BIMF-VSM-REC-ITEM-AMT-STATUS      PIC    X(01).
                88  BIMF-VSM-REC-ITEM-ITEM-AMT-OK VALUE ' '.
            15  FILLER                            PIC    X(14).
```

FIG. 12

BIMF - Bundle Item Master File

| BIMF Key | Data Records |
| --- | --- |
| ATL 19980102 12345678 99,999,999.99 hhmmss 1234500001 ' ' | 76000215 Transit Debit |
| | 76000217 Transit Debit |
| ATL 19980102 12345678 99,999,999.99 hhmmss 1234500001 ' ' | 77000227 Transit Item |
| | ... |
| | 77000327 Transit Item |
| | 77000329 Transit Item |

FIG. 13

| ON-US ITEM IMAGE DATABASE | 143 |
|---|---|
| IMAGE DATE | 151 |
| BANK ID NUMBER | 152 |
| ACCOUNT NUMBER | 153 |
| SEQUENCE NUMBER | 154 |
| SORTER ID NUMBER | 155 |
| SORTER CYCLE | 156 |
| IMAGE DATA | 157 |

| TRANSMIT ITEM IMAGE DATABASE | 144 |
|---|---|
| IMAGE DATE | 161 |
| SEQUENCE NUMBER | 162 |
| SORTER ID NUMBER | 163 |
| SORTER CYCLE | 164 |
| IMAGE DATA | 165 |

| WHITE PAPER IMAGE DATABASE | 145 |
|---|---|
| IMAGE DATE | 171 |
| BANK ID NUMBER | 172 |
| ACCOUNT NUMBER | 173 |
| SEQUENCE NUMBER | 174 |
| SORTER ID NUMBER | 175 |
| SORTER CYCLE | 176 |
| IMAGE DATA | 177 |

```
IMAI              ITEM CAPTURE RESEARCH SYSTEM
                     ENTRY AND ITEM RETRIEVAL

MESSAGE         ENTER SEARCH CRITERIA
CAPTURE SITE    ATL
CAPTURE DATE    19980102   TO   19980102
POST DATE       19980102   TO   19980102
ENTRY           000001     TO   999999
SEQUENCE NUMBER 00SS00000000
                --------- OR ---------
DEBIT/CREDIT/ALL  X
ITEM AMOUNT       99,999,999.99
RT                9999999999
ACCOUNT           999999999999
OBTAIN CCIF       X

CLEAR-END PF 12-HELP
```

Figure 20:
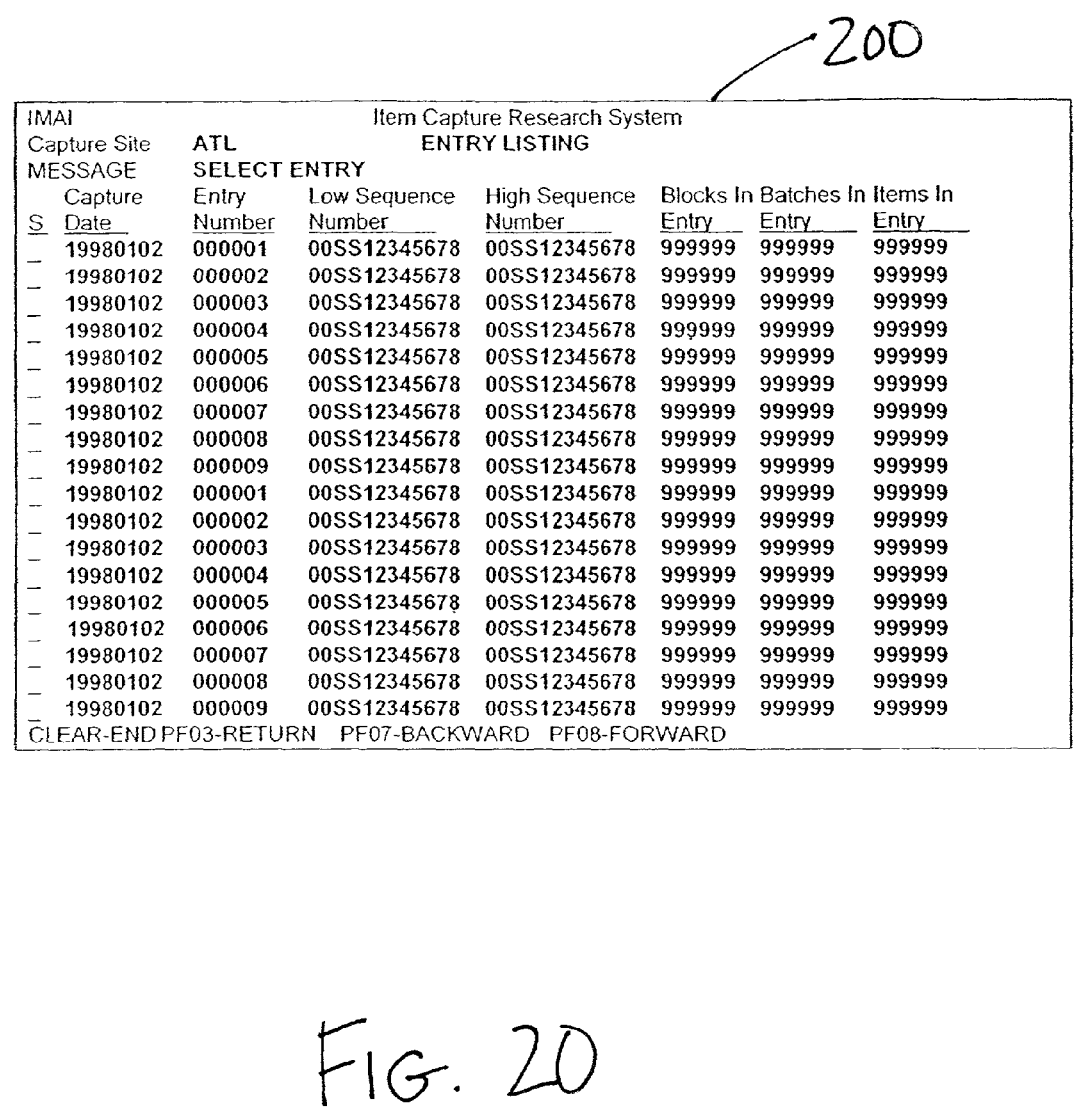

200

IMAI Item Capture Research System

Capture Site ATL ENTRY LISTING

MESSAGE SELECT ENTRY

| S | Capture Date | Entry Number | Low Sequence Number | High Sequence Number | Blocks In Entry | Batches In Entry | Items In Entry |
|---|---|---|---|---|---|---|---|
| _ | 19980102 | 000001 | 00SS12345678 | 00SS12345678 | 999999 | 999999 | 999999 |
| _ | 19980102 | 000002 | 00SS12345678 | 00SS12345678 | 999999 | 999999 | 999999 |
| _ | 19980102 | 000003 | 00SS12345678 | 00SS12345678 | 999999 | 999999 | 999999 |
| _ | 19980102 | 000004 | 00SS12345678 | 00SS12345678 | 999999 | 999999 | 999999 |
| _ | 19980102 | 000005 | 00SS12345678 | 00SS12345678 | 999999 | 999999 | 999999 |
| _ | 19980102 | 000006 | 00SS12345678 | 00SS12345678 | 999999 | 999999 | 999999 |
| _ | 19980102 | 000007 | 00SS12345678 | 00SS12345678 | 999999 | 999999 | 999999 |
| _ | 19980102 | 000008 | 00SS12345678 | 00SS12345678 | 999999 | 999999 | 999999 |
| _ | 19980102 | 000009 | 00SS12345678 | 00SS12345678 | 999999 | 999999 | 999999 |
| _ | 19980102 | 000001 | 00SS12345678 | 00SS12345678 | 999999 | 999999 | 999999 |
| _ | 19980102 | 000002 | 00SS12345678 | 00SS12345678 | 999999 | 999999 | 999999 |
| _ | 19980102 | 000003 | 00SS12345678 | 00SS12345678 | 999999 | 999999 | 999999 |
| _ | 19980102 | 000004 | 00SS12345678 | 00SS12345678 | 999999 | 999999 | 999999 |
| _ | 19980102 | 000005 | 00SS12345678 | 00SS12345678 | 999999 | 999999 | 999999 |
| _ | 19980102 | 000006 | 00SS12345678 | 00SS12345678 | 999999 | 999999 | 999999 |
| _ | 19980102 | 000007 | 00SS12345678 | 00SS12345678 | 999999 | 999999 | 999999 |
| _ | 19980102 | 000008 | 00SS12345678 | 00SS12345678 | 999999 | 999999 | 999999 |
| _ | 19980102 | 000009 | 00SS12345678 | 00SS12345678 | 999999 | 999999 | 999999 |

CLEAR-END PF03-RETURN PF07-BACKWARD PF08-FORWARD

Figure 21:
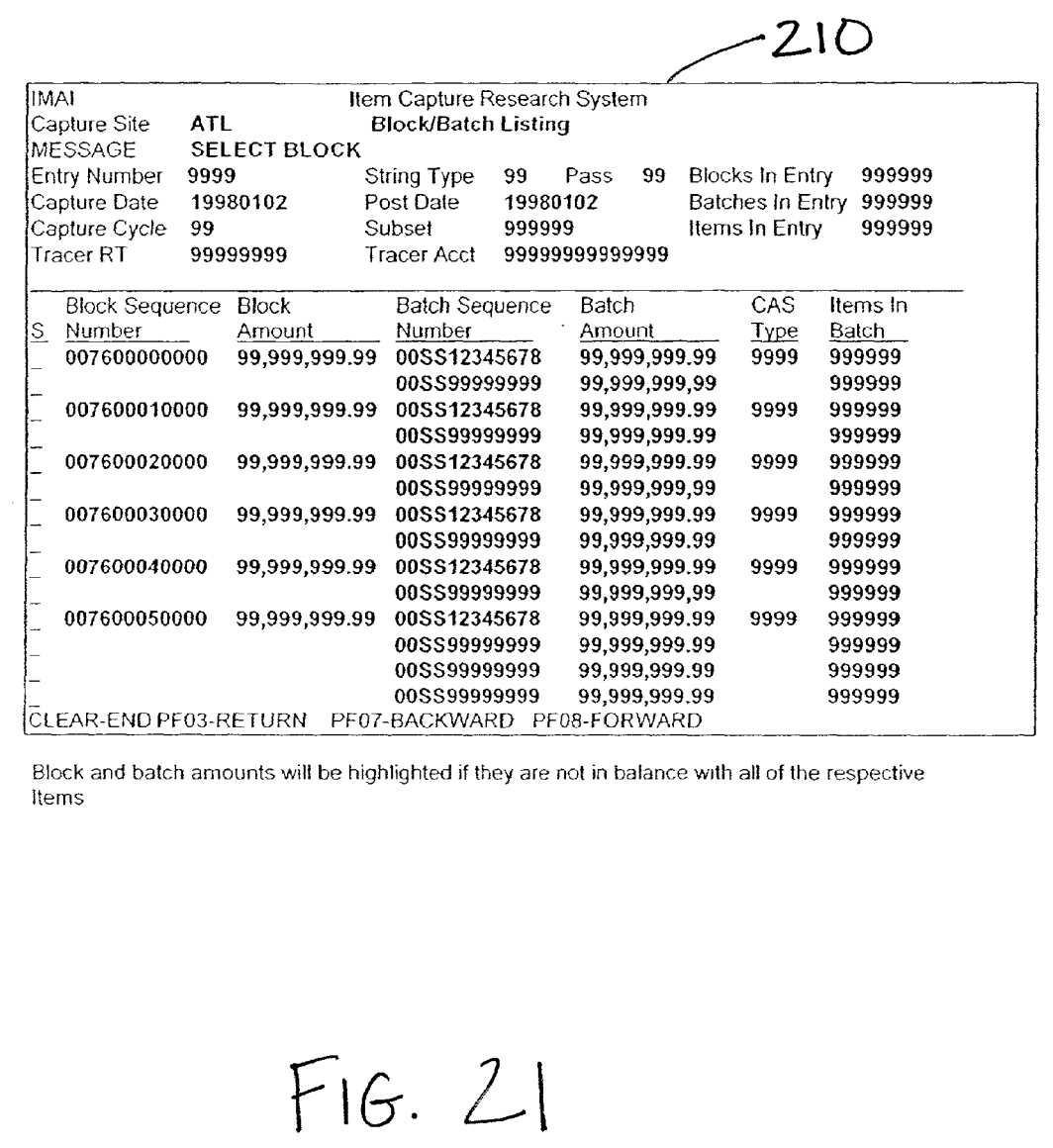

IMAI Item Capture Research System
Capture Site ATL Block/Batch Listing
MESSAGE SELECT BLOCK
Entry Number 9999 String Type 99 Pass 99 Blocks In Entry 999999
Capture Date 19980102 Post Date 19980102 Batches In Entry 999999
Capture Cycle 99 Subset 999999 Items In Entry 999999
Tracer RT 99999999 Tracer Acct 99999999999999

| S | Block Sequence Number | Block Amount | Batch Sequence Number | Batch Amount | CAS Type | Items In Batch |
|---|---|---|---|---|---|---|
| _ | 007600000000 | 99,999,999.99 | 00SS12345678 | 99,999,999.99 | 9999 | 999999 |
| _ | | | 00SS99999999 | 99,999,999,99 | | 999999 |
| _ | 007600010000 | 99,999,999.99 | 00SS12345678 | 99,999,999.99 | 9999 | 999999 |
| _ | | | 00SS99999999 | 99,999,999.99 | | 999999 |
| _ | 007600020000 | 99,999,999.99 | 00SS12345678 | 99,999,999.99 | 9999 | 999999 |
| _ | | | 00SS99999999 | 99,999,999,99 | | 999999 |
| _ | 007600030000 | 99,999,999.99 | 00SS12345678 | 99,999,999.99 | 9999 | 999999 |
| _ | | | 00SS99999999 | 99,999,999.99 | | 999999 |
| _ | 007600040000 | 99,999,999.99 | 00SS12345678 | 99,999,999.99 | 9999 | 999999 |
| _ | | | 00SS99999999 | 99,999,999,99 | | 999999 |
| _ | 007600050000 | 99,999,999.99 | 00SS12345678 | 99,999,999.99 | 9999 | 999999 |
| _ | | | 00SS99999999 | 99,999,999.99 | | 999999 |
| _ | | | 00SS99999999 | 99,999,999.99 | | 999999 |
| _ | | | 00SS99999999 | 99,999,999.99 | | 999999 |

CLEAR-END PF03-RETURN PF07-BACKWARD PF08-FORWARD

Block and batch amounts will be highlighted if they are not in balance with all of the respective Items

Figure 22:
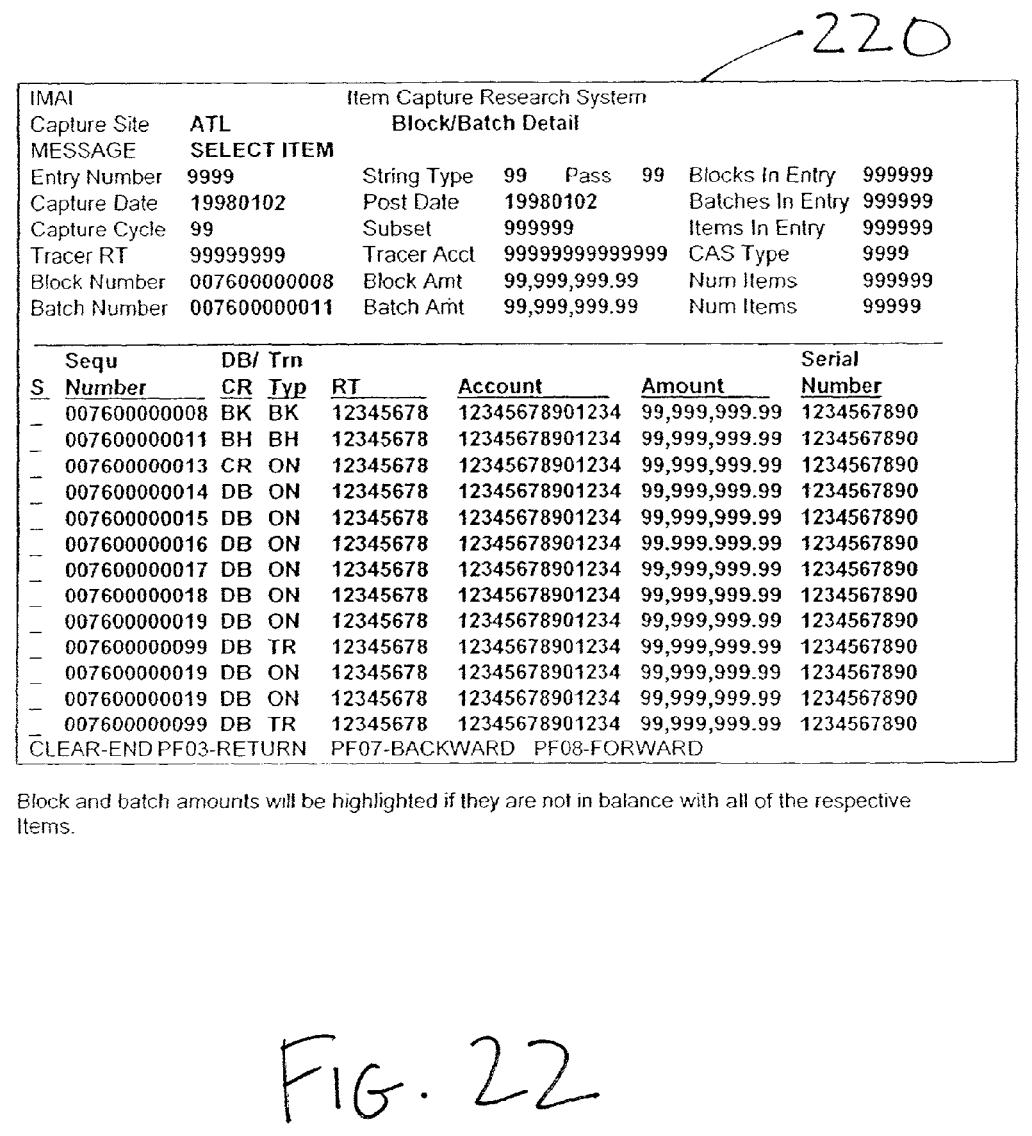

IMAI Item Capture Research System

Capture Site ATL Block/Batch Detail

MESSAGE SELECT ITEM

| | | | | | |
|---|---|---|---|---|---|
| Entry Number | 9999 | String Type | 99 Pass 99 | Blocks In Entry | 999999 |
| Capture Date | 19980102 | Post Date | 19980102 | Batches In Entry | 999999 |
| Capture Cycle | 99 | Subset | 999999 | Items In Entry | 999999 |
| Tracer RT | 99999999 | Tracer Acct | 99999999999999 | CAS Type | 9999 |
| Block Number | 007600000008 | Block Amt | 99,999,999.99 | Num Items | 999999 |
| Batch Number | 007600000011 | Batch Amt | 99,999,999.99 | Num Items | 99999 |

| S | Sequ Number | DB/ CR | Trn Typ | RT | Account | Amount | Serial Number |
|---|---|---|---|---|---|---|---|
| _ | 007600000008 | BK | BK | 12345678 | 12345678901234 | 99,999,999.99 | 1234567890 |
| _ | 007600000011 | BH | BH | 12345678 | 12345678901234 | 99,999,999.99 | 1234567890 |
| _ | 007600000013 | CR | ON | 12345678 | 12345678901234 | 99,999,999.99 | 1234567890 |
| _ | 007600000014 | DB | ON | 12345678 | 12345678901234 | 99,999,999.99 | 1234567890 |
| _ | 007600000015 | DB | ON | 12345678 | 12345678901234 | 99,999,999.99 | 1234567890 |
| _ | 007600000016 | DB | ON | 12345678 | 12345678901234 | 99.999.999.99 | 1234567890 |
| _ | 007600000017 | DB | ON | 12345678 | 12345678901234 | 99,999,999.99 | 1234567890 |
| _ | 007600000018 | DB | ON | 12345678 | 12345678901234 | 99,999,999.99 | 1234567890 |
| _ | 007600000019 | DB | ON | 12345678 | 12345678901234 | 99,999,999.99 | 1234567890 |
| _ | 007600000099 | DB | TR | 12345678 | 12345678901234 | 99,999,999.99 | 1234567890 |
| _ | 007600000019 | DB | ON | 12345678 | 12345678901234 | 99,999,999.99 | 1234567890 |
| _ | 007600000019 | DB | ON | 12345678 | 12345678901234 | 99,999,999.99 | 1234567890 |
| _ | 007600000099 | DB | TR | 12345678 | 12345678901234 | 99,999,999.99 | 1234567890 |

CLEAR-END PF03-RETURN PF07-BACKWARD PF08-FORWARD

Block and batch amounts will be highlighted if they are not in balance with all of the respective Items.

Figure 23:
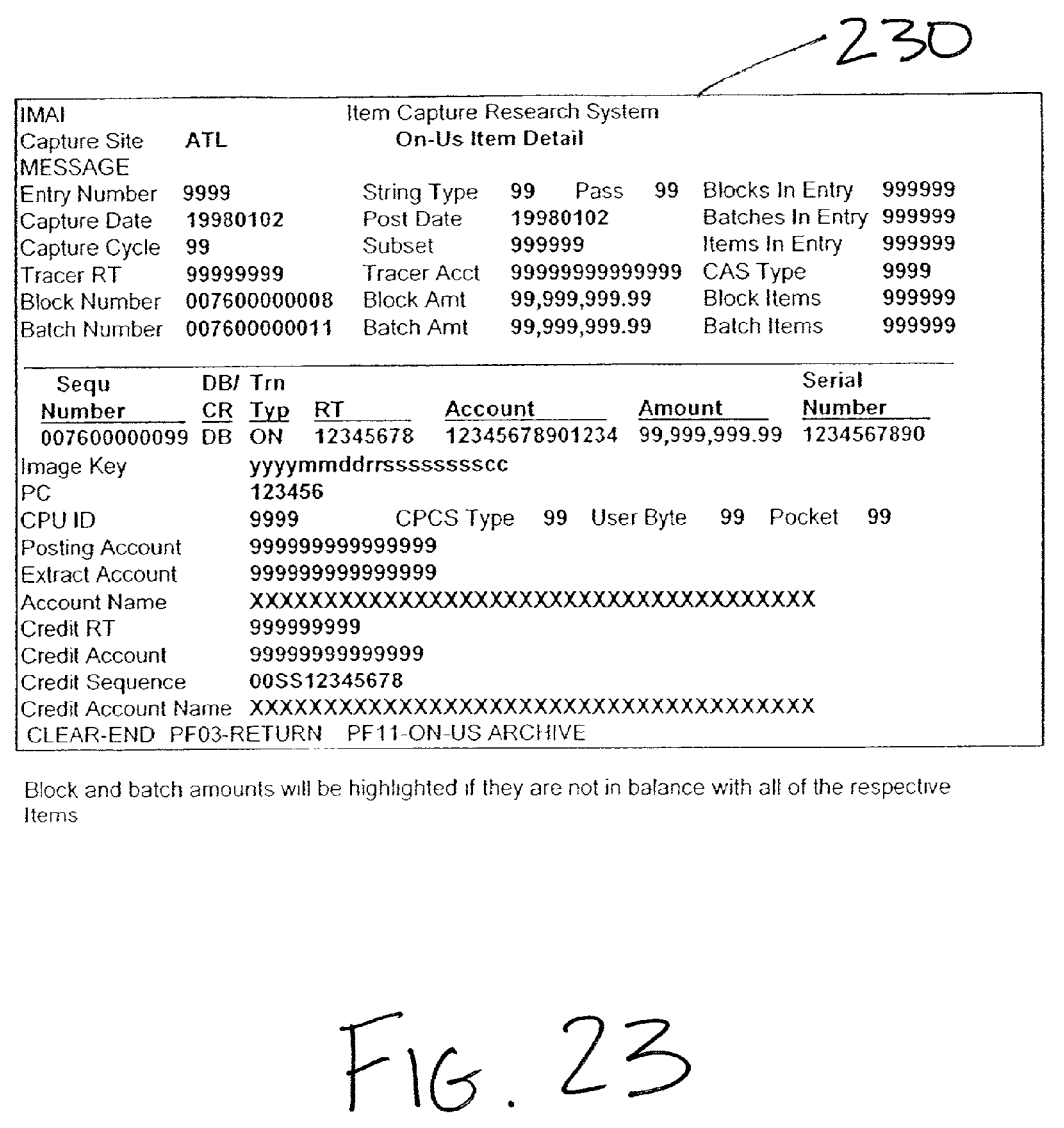

IMAI Item Capture Research System

Capture Site ATL On-Us Item Detail

MESSAGE

| | | | | | | | |
|---|---|---|---|---|---|---|---|
| Entry Number | 9999 | String Type | 99 | Pass | 99 | Blocks In Entry | 999999 |
| Capture Date | 19980102 | Post Date | 19980102 | | | Batches In Entry | 999999 |
| Capture Cycle | 99 | Subset | 999999 | | | Items In Entry | 999999 |
| Tracer RT | 99999999 | Tracer Acct | 99999999999999 | | | CAS Type | 9999 |
| Block Number | 007600000008 | Block Amt | 99,999,999.99 | | | Block Items | 999999 |
| Batch Number | 007600000011 | Batch Amt | 99,999,999.99 | | | Batch Items | 999999 |

| Sequ Number | DB/ CR | Trn Typ | RT | Account | Amount | Serial Number |
|---|---|---|---|---|---|---|
| 007600000099 | DB | ON | 12345678 | 12345678901234 | 99,999,999.99 | 1234567890 |

| | |
|---|---|
| Image Key | yyyymmddrrsssssssscc |
| PC | 123456 |
| CPU ID | 9999 CPCS Type 99 User Byte 99 Pocket 99 |
| Posting Account | 999999999999999 |
| Extract Account | 999999999999999 |
| Account Name | XXXXXXXXXXXXXXXXXXXXXXXXXXXXXXXXXXXXXXX |
| Credit RT | 999999999 |
| Credit Account | 99999999999999 |
| Credit Sequence | 00SS12345678 |
| Credit Account Name | XXXXXXXXXXXXXXXXXXXXXXXXXXXXXXXXXXXXXXX |

CLEAR-END PF03-RETURN PF11-ON-US ARCHIVE

Block and batch amounts will be highlighted if they are not in balance with all of the respective Items

Figure 24:
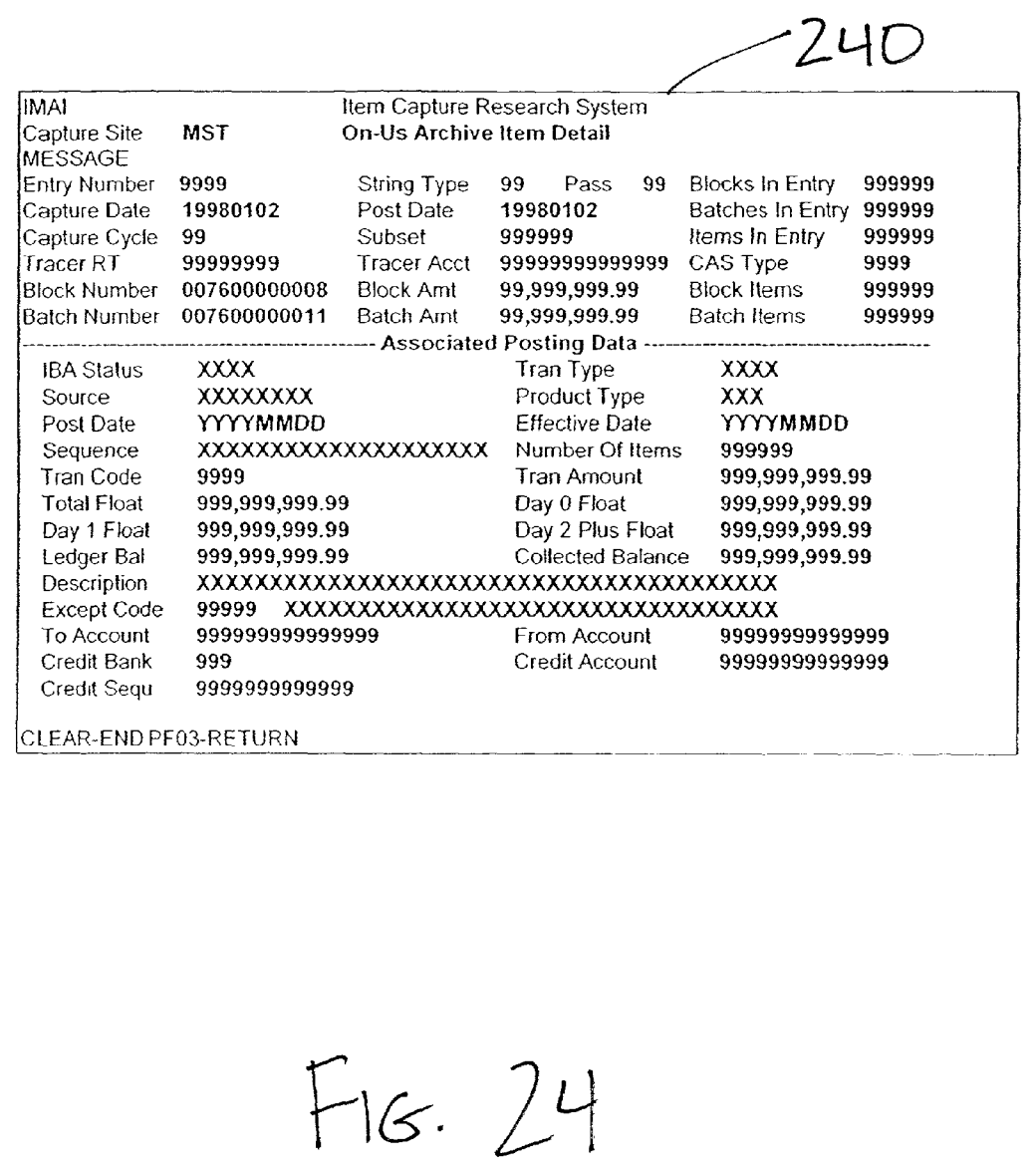

IMAI Item Capture Research System
Capture Site MST On-Us Archive Item Detail
MESSAGE

| | | | | | |
|---|---|---|---|---|---|
| Entry Number | 9999 | String Type | 99 Pass 99 | Blocks In Entry | 999999 |
| Capture Date | 19980102 | Post Date | 19980102 | Batches In Entry | 999999 |
| Capture Cycle | 99 | Subset | 999999 | Items In Entry | 999999 |
| Tracer RT | 99999999 | Tracer Acct | 99999999999999 | CAS Type | 9999 |
| Block Number | 007600000008 | Block Amt | 99,999,999.99 | Block Items | 999999 |
| Batch Number | 007600000011 | Batch Amt | 99,999,999.99 | Batch Items | 999999 |

------------------------------------------ Associated Posting Data ------------------------------------------

| | | | |
|---|---|---|---|
| IBA Status | XXXX | Tran Type | XXXX |
| Source | XXXXXXXX | Product Type | XXX |
| Post Date | YYYYMMDD | Effective Date | YYYYMMDD |
| Sequence | XXXXXXXXXXXXXXXXXXXX | Number Of Items | 999999 |
| Tran Code | 9999 | Tran Amount | 999,999,999.99 |
| Total Float | 999,999,999.99 | Day 0 Float | 999,999,999.99 |
| Day 1 Float | 999,999,999.99 | Day 2 Plus Float | 999,999,999.99 |
| Ledger Bal | 999,999,999.99 | Collected Balance | 999,999,999.99 |
| Description | XXXXXXXXXXXXXXXXXXXXXXXXXXXXXXXXXXXXXXXX | | |
| Except Code | 99999 XXXXXXXXXXXXXXXXXXXXXXXXXXXXXXXXXX | | |
| To Account | 999999999999999 | From Account | 99999999999999 |
| Credit Bank | 999 | Credit Account | 99999999999999 |
| Credit Sequ | 9999999999999 | | |

CLEAR-END PF03-RETURN

Figure 25:
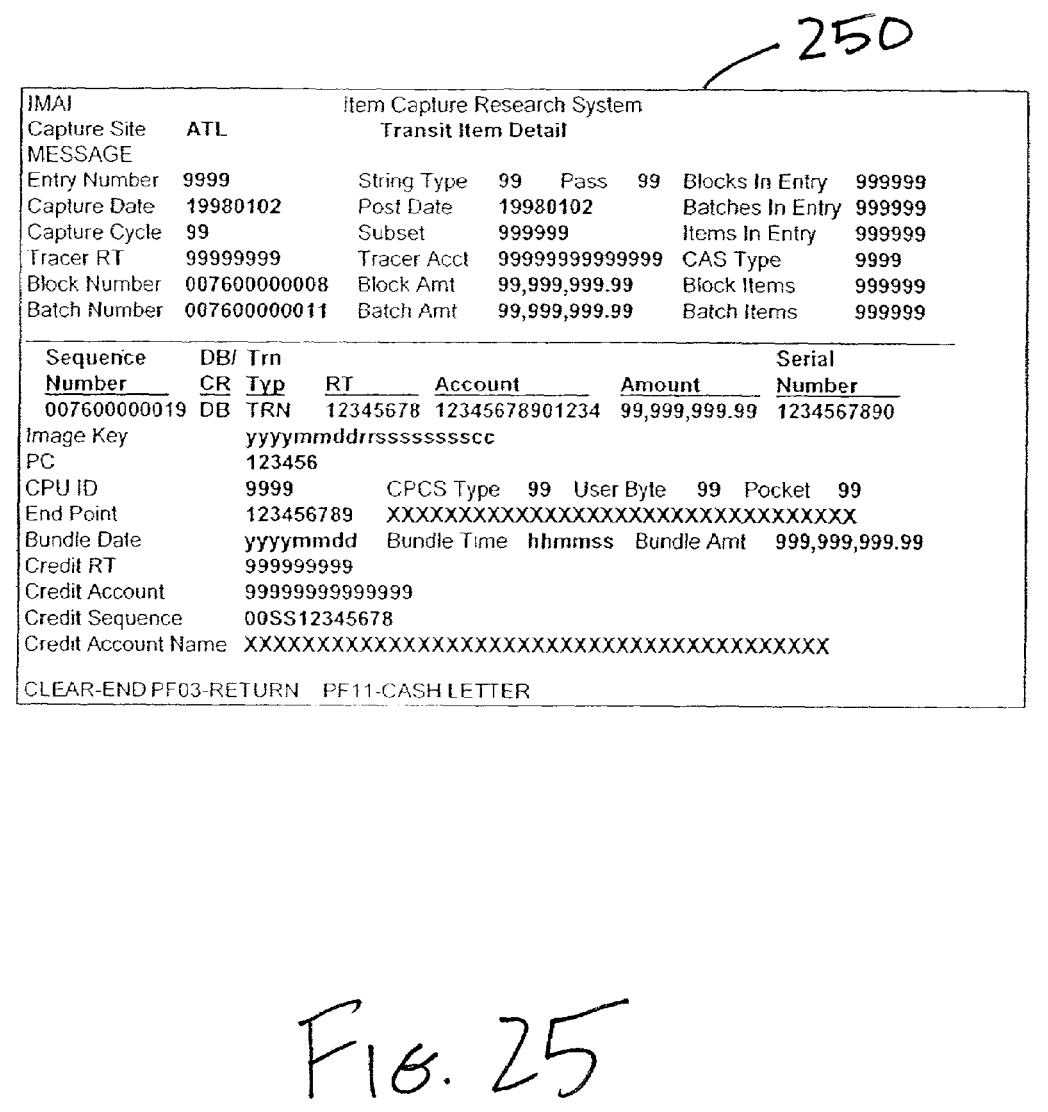

```
IMAI                                Item Capture Research System
Capture Site    ATL                      Transit Item Detail
MESSAGE
Entry Number    9999            String Type    99    Pass   99     Blocks In Entry    999999
Capture Date    19980102        Post Date      19980102            Batches In Entry   999999
Capture Cycle   99              Subset         999999              Items In Entry     999999
Tracer RT       99999999        Tracer Acct    99999999999999      CAS Type           9999
Block Number    007600000008    Block Amt      99,999,999.99       Block Items        999999
Batch Number    007600000011    Batch Amt      99,999,999.99       Batch Items        999999

  Sequence      DB/ Trn                                                   Serial
  Number        CR  Typ   RT        Account          Amount              Number
  007600000019  DB  TRN   12345678  12345678901234   99,999,999.99       1234567890
Image Key           yyyymmddrrsssssssscc
PC                  123456
CPU ID              9999        CPCS Type   99   User Byte   99   Pocket   99
End Point           123456789   XXXXXXXXXXXXXXXXXXXXXXXXXXXXXXXXXX
Bundle Date         yyyymmdd    Bundle Time   hhmmss   Bundle Amt   999,999,999.99
Credit RT           999999999
Credit Account      99999999999999
Credit Sequence     00SS12345678
Credit Account Name XXXXXXXXXXXXXXXXXXXXXXXXXXXXXXXXXXXXXXXXXX

CLEAR-END PF03-RETURN   PF11-CASH LETTER
```

Figure 26:
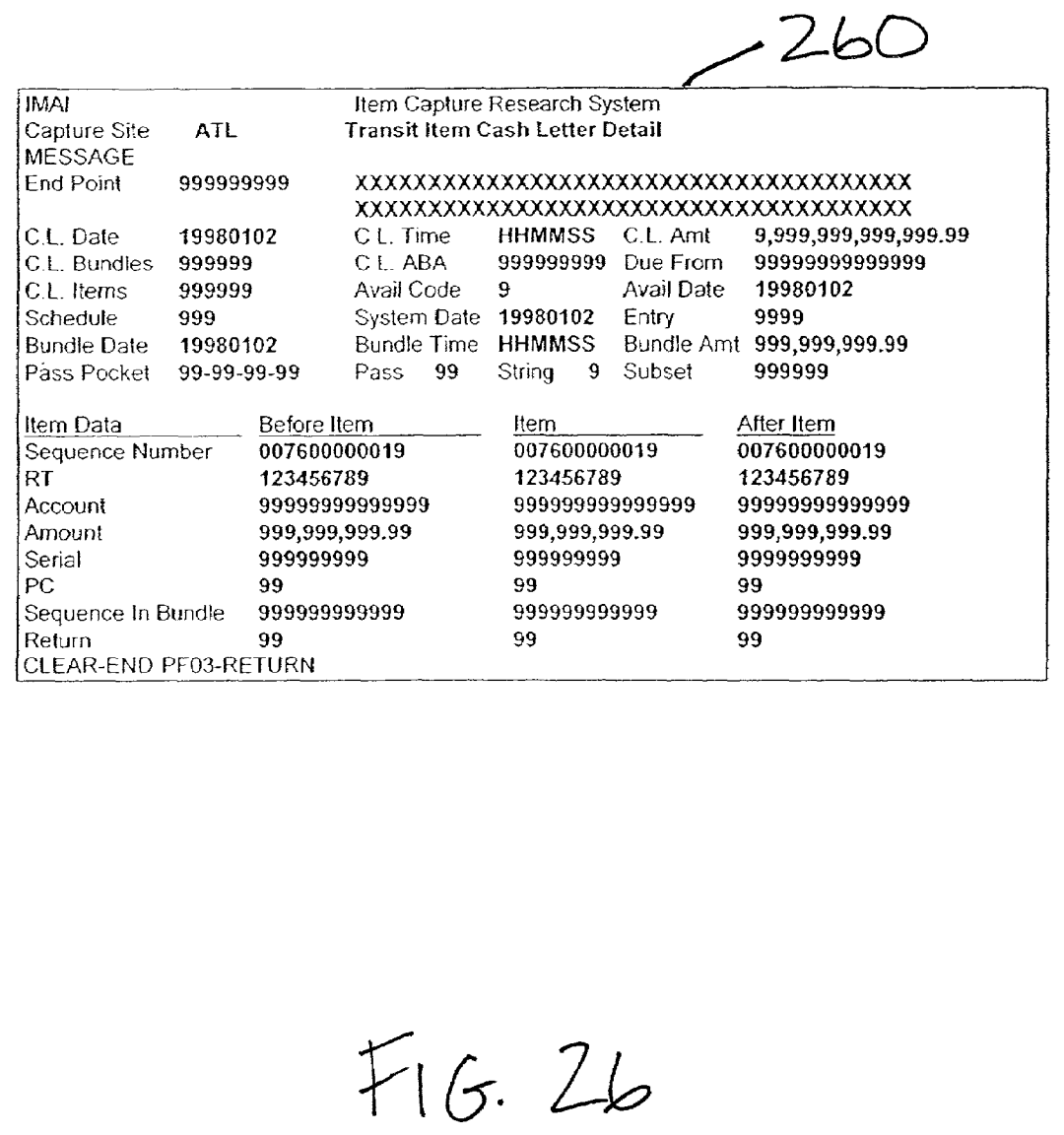

IMAI Item Capture Research System
Capture Site ATL Transit Item Cash Letter Detail
MESSAGE
End Point 999999999 XXXXXXXXXXXXXXXXXXXXXXXXXXXXXXXXXXXXXXX
XXXXXXXXXXXXXXXXXXXXXXXXXXXXXXXXXXXXXXX

| | | | | | |
|---|---|---|---|---|---|
| C.L. Date | 19980102 | C.L. Time | HHMMSS | C.L. Amt | 9,999,999,999,999.99 |
| C.L. Bundles | 999999 | C.L. ABA | 999999999 | Due From | 99999999999999 |
| C.L. Items | 999999 | Avail Code | 9 | Avail Date | 19980102 |
| Schedule | 999 | System Date | 19980102 | Entry | 9999 |
| Bundle Date | 19980102 | Bundle Time | HHMMSS | Bundle Amt | 999,999,999.99 |
| Pass Pocket | 99-99-99-99 | Pass 99 | String 9 | Subset | 999999 |

| Item Data | Before Item | Item | After Item |
|---|---|---|---|
| Sequence Number | 007600000019 | 007600000019 | 007600000019 |
| RT | 123456789 | 123456789 | 123456789 |
| Account | 99999999999999 | 999999999999999 | 99999999999999 |
| Amount | 999,999,999.99 | 999,999,999.99 | 999,999,999.99 |
| Serial | 999999999 | 999999999 | 9999999999 |
| PC | 99 | 99 | 99 |
| Sequence In Bundle | 999999999999 | 999999999999 | 999999999999 |
| Return | 99 | 99 | 99 |

CLEAR-END PF03-RETURN

Figure 27:
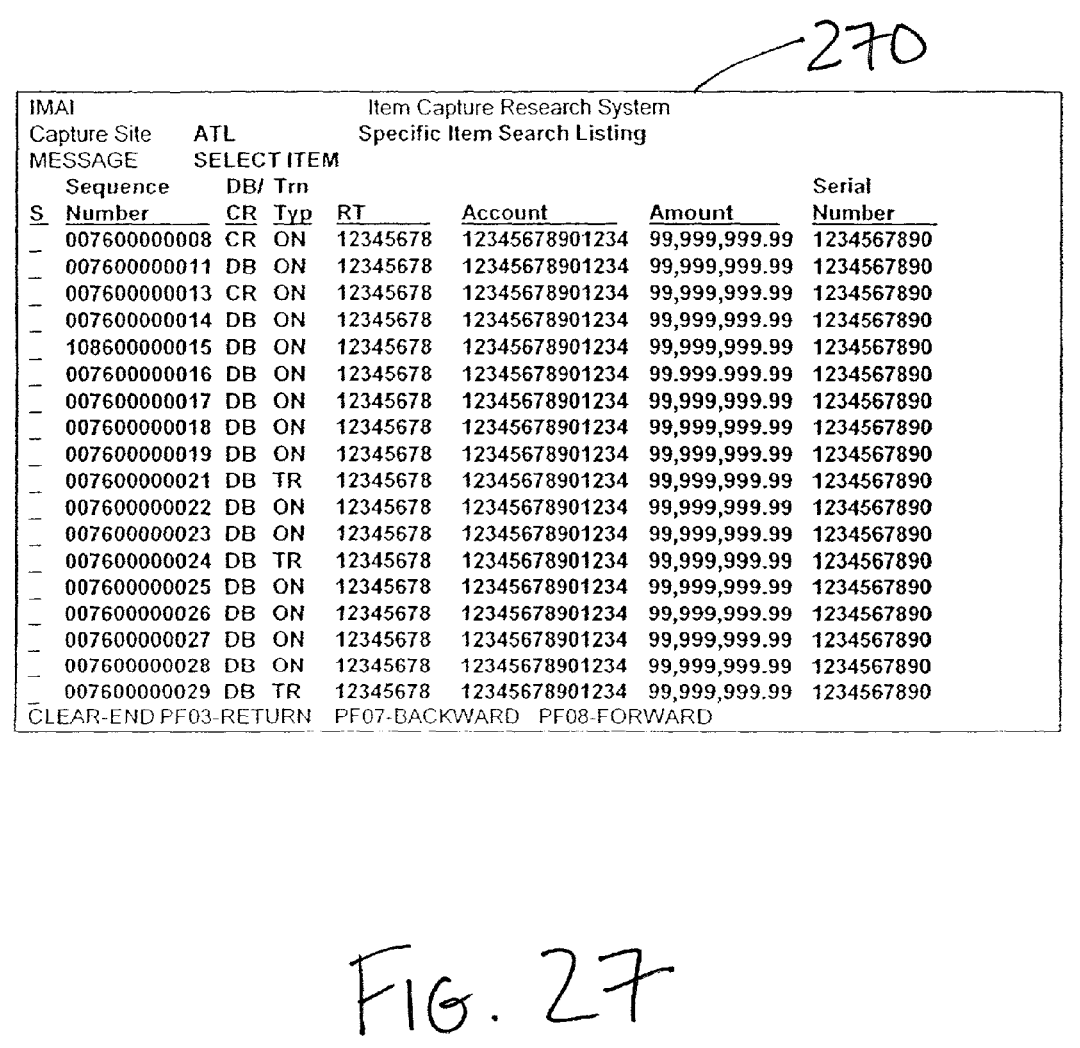

IMAI Item Capture Research System
Capture Site ATL Specific Item Search Listing
MESSAGE SELECT ITEM

| S | Sequence Number | DB/ CR | Trn Typ | RT | Account | Amount | Serial Number |
|---|---|---|---|---|---|---|---|
| _ | 007600000008 | CR | ON | 12345678 | 12345678901234 | 99,999,999.99 | 1234567890 |
| _ | 007600000011 | DB | ON | 12345678 | 12345678901234 | 99,999,999.99 | 1234567890 |
| _ | 007600000013 | CR | ON | 12345678 | 12345678901234 | 99,999,999.99 | 1234567890 |
| _ | 007600000014 | DB | ON | 12345678 | 12345678901234 | 99,999,999.99 | 1234567890 |
| _ | 108600000015 | DB | ON | 12345678 | 12345678901234 | 99,999,999.99 | 1234567890 |
| _ | 007600000016 | DB | ON | 12345678 | 12345678901234 | 99.999.999.99 | 1234567890 |
| _ | 007600000017 | DB | ON | 12345678 | 12345678901234 | 99,999,999.99 | 1234567890 |
| _ | 007600000018 | DB | ON | 12345678 | 12345678901234 | 99,999,999.99 | 1234567890 |
| _ | 007600000019 | DB | ON | 12345678 | 12345678901234 | 99,999,999.99 | 1234567890 |
| _ | 007600000021 | DB | TR | 12345678 | 12345678901234 | 99,999,999.99 | 1234567890 |
| _ | 007600000022 | DB | ON | 12345678 | 12345678901234 | 99,999,999.99 | 1234567890 |
| _ | 007600000023 | DB | ON | 12345678 | 12345678901234 | 99,999,999.99 | 1234567890 |
| _ | 007600000024 | DB | TR | 12345678 | 12345678901234 | 99,999,999.99 | 1234567890 |
| _ | 007600000025 | DB | ON | 12345678 | 12345678901234 | 99,999,999.99 | 1234567890 |
| _ | 007600000026 | DB | ON | 12345678 | 12345678901234 | 99,999,999.99 | 1234567890 |
| _ | 007600000027 | DB | ON | 12345678 | 12345678901234 | 99,999,999.99 | 1234567890 |
| _ | 007600000028 | DB | ON | 12345678 | 12345678901234 | 99,999,999.99 | 1234567890 |
| _ | 007600000029 | DB | TR | 12345678 | 12345678901234 | 99,999,999.99 | 1234567890 |

CLEAR-END PF03-RETURN PF07-BACKWARD PF08-FORWARD

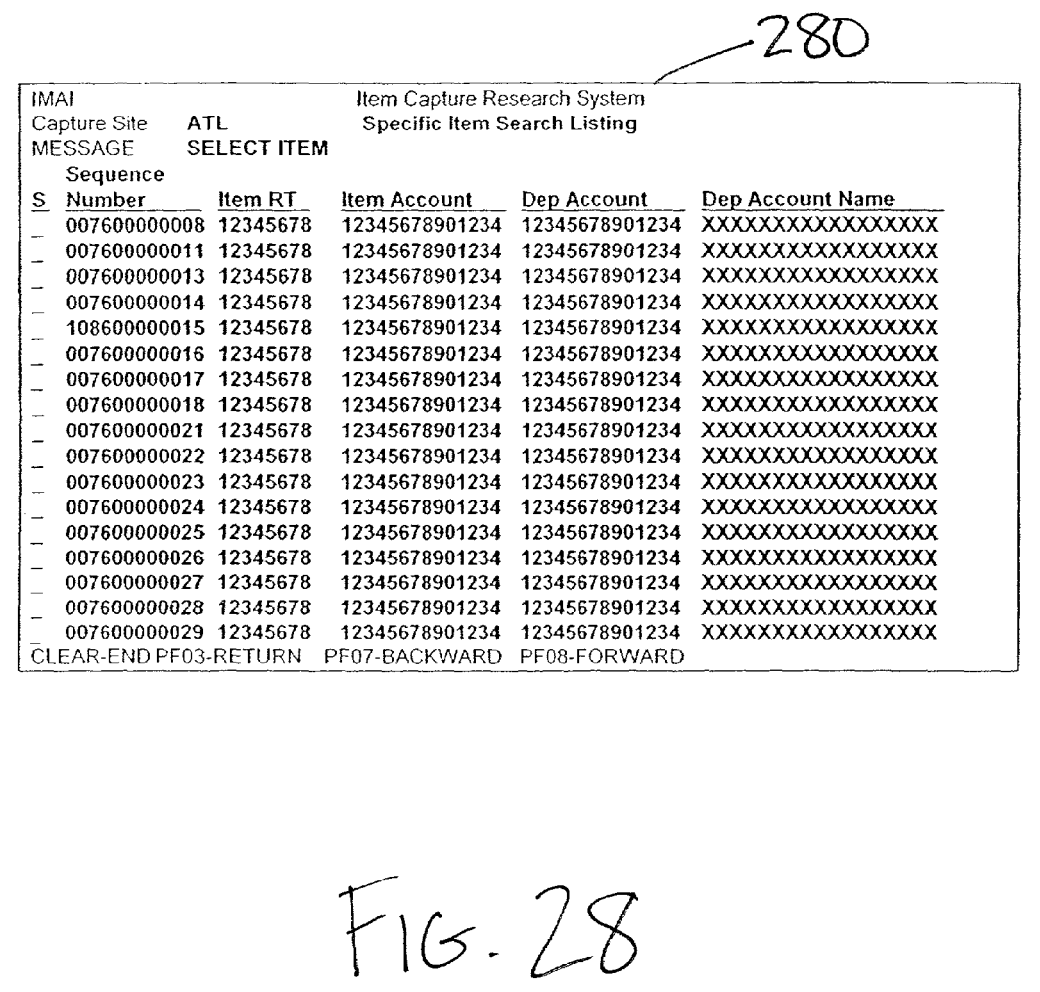

IMAI Item Capture Research System
Capture Site ATL Specific Item Search Listing
MESSAGE SELECT ITEM

| S | Sequence Number | Item RT | Item Account | Dep Account | Dep Account Name |
|---|---|---|---|---|---|
| _ | 007600000008 | 12345678 | 12345678901234 | 12345678901234 | XXXXXXXXXXXXXXXXX |
| _ | 007600000011 | 12345678 | 12345678901234 | 12345678901234 | XXXXXXXXXXXXXXXXX |
| _ | 007600000013 | 12345678 | 12345678901234 | 12345678901234 | XXXXXXXXXXXXXXXXX |
| _ | 007600000014 | 12345678 | 12345678901234 | 12345678901234 | XXXXXXXXXXXXXXXXX |
| _ | 108600000015 | 12345678 | 12345678901234 | 12345678901234 | XXXXXXXXXXXXXXXXX |
| _ | 007600000016 | 12345678 | 12345678901234 | 12345678901234 | XXXXXXXXXXXXXXXXX |
| _ | 007600000017 | 12345678 | 12345678901234 | 12345678901234 | XXXXXXXXXXXXXXXXX |
| _ | 007600000018 | 12345678 | 12345678901234 | 12345678901234 | XXXXXXXXXXXXXXXXX |
| _ | 007600000021 | 12345678 | 12345678901234 | 12345678901234 | XXXXXXXXXXXXXXXXX |
| _ | 007600000022 | 12345678 | 12345678901234 | 12345678901234 | XXXXXXXXXXXXXXXXX |
| _ | 007600000023 | 12345678 | 12345678901234 | 12345678901234 | XXXXXXXXXXXXXXXXX |
| _ | 007600000024 | 12345678 | 12345678901234 | 12345678901234 | XXXXXXXXXXXXXXXXX |
| _ | 007600000025 | 12345678 | 12345678901234 | 12345678901234 | XXXXXXXXXXXXXXXXX |
| _ | 007600000026 | 12345678 | 12345678901234 | 12345678901234 | XXXXXXXXXXXXXXXXX |
| _ | 007600000027 | 12345678 | 12345678901234 | 12345678901234 | XXXXXXXXXXXXXXXXX |
| _ | 007600000028 | 12345678 | 12345678901234 | 12345678901234 | XXXXXXXXXXXXXXXXX |
| _ | 007600000029 | 12345678 | 12345678901234 | 12345678901234 | XXXXXXXXXXXXXXXXX |

CLEAR-END PF03-RETURN PF07-BACKWARD PF08-FORWARD

FIG. 28

```
290A ┐ IMCL                    ITEM CAPTURE RESEARCH SYSTEM
       ├ CAPTURE SITE    ATL          CASH LETTER RETRIEVAL
290B ┐ MESSAGE
       ├ DATE            19980102    TO    19980102
290D ──┤ END POINT       000000000
        C.L./BUNDLE FLAG  X
290C ──┤ C.L./BUNDLEAMT  0,000,000,000,000.00   TO   9,999,999,999,999.99
        ITEM AMT         00000000.00   BEFORE AMT   00000000.00   AFTER AMT   00000000.00
290E ┘

CLEAR-END
```

Figure 30:
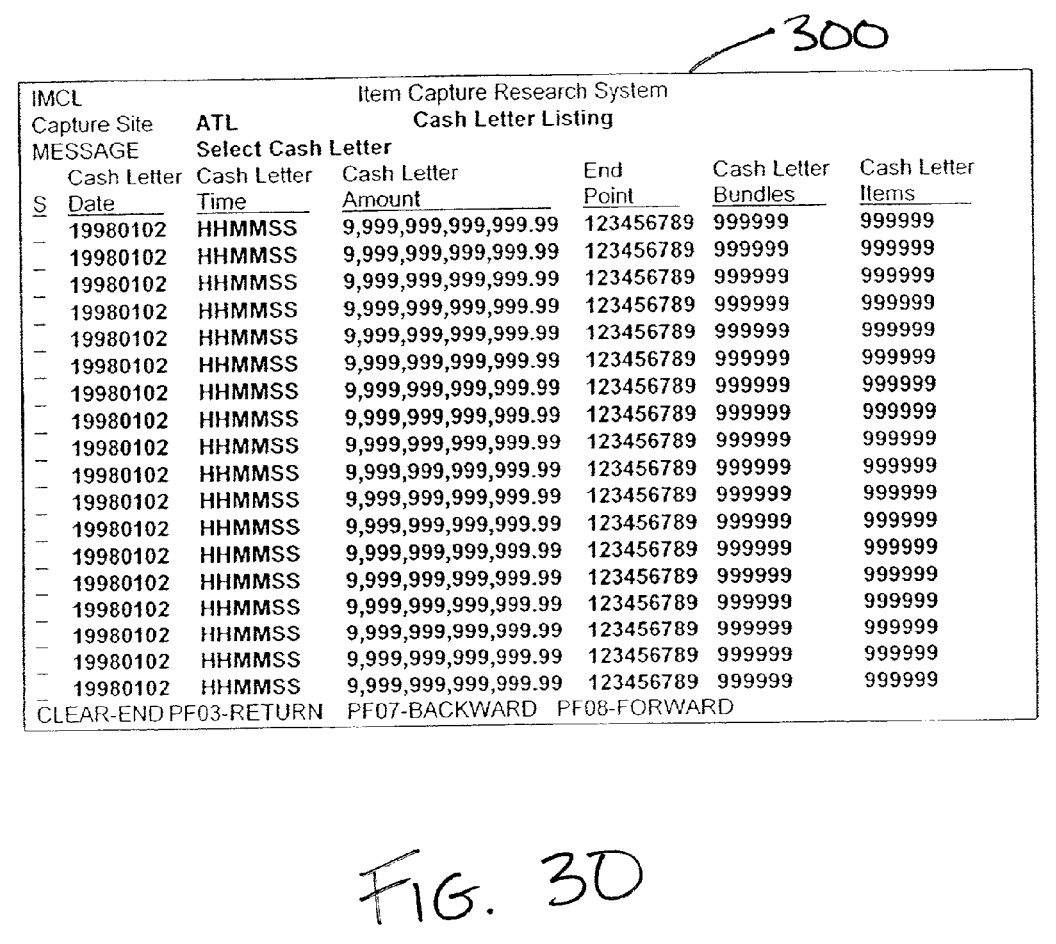

300

IMCL Item Capture Research System
Capture Site ATL Cash Letter Listing
MESSAGE Select Cash Letter

| S | Cash Letter Date | Cash Letter Time | Cash Letter Amount | End Point | Cash Letter Bundles | Cash Letter Items |
|---|---|---|---|---|---|---|
| _ | 19980102 | HHMMSS | 9,999,999,999,999.99 | 123456789 | 999999 | 999999 |
| _ | 19980102 | HHMMSS | 9,999,999,999,999.99 | 123456789 | 999999 | 999999 |
| _ | 19980102 | HHMMSS | 9,999,999,999,999.99 | 123456789 | 999999 | 999999 |
| _ | 19980102 | HHMMSS | 9,999,999,999,999.99 | 123456789 | 999999 | 999999 |
| _ | 19980102 | HHMMSS | 9,999,999,999,999.99 | 123456789 | 999999 | 999999 |
| _ | 19980102 | HHMMSS | 9,999,999,999,999.99 | 123456789 | 999999 | 999999 |
| _ | 19980102 | HHMMSS | 9,999,999,999,999.99 | 123456789 | 999999 | 999999 |
| _ | 19980102 | HHMMSS | 9,999,999,999,999.99 | 123456789 | 999999 | 999999 |
| _ | 19980102 | HHMMSS | 9,999,999,999,999.99 | 123456789 | 999999 | 999999 |
| _ | 19980102 | HHMMSS | 9,999,999,999,999.99 | 123456789 | 999999 | 999999 |
| _ | 19980102 | HHMMSS | 9,999,999,999,999.99 | 123456789 | 999999 | 999999 |
| _ | 19980102 | HHMMSS | 9,999,999,999,999.99 | 123456789 | 999999 | 999999 |
| _ | 19980102 | HHMMSS | 9,999,999,999,999.99 | 123456789 | 999999 | 999999 |
| _ | 19980102 | HHMMSS | 9,999,999,999,999.99 | 123456789 | 999999 | 999999 |
| _ | 19980102 | HHMMSS | 9,999,999,999,999.99 | 123456789 | 999999 | 999999 |
| _ | 19980102 | HHMMSS | 9,999,999,999,999.99 | 123456789 | 999999 | 999999 |
| _ | 19980102 | HHMMSS | 9,999,999,999,999.99 | 123456789 | 999999 | 999999 |
| _ | 19980102 | HHMMSS | 9,999,999,999,999.99 | 123456789 | 999999 | 999999 |

CLEAR-END PF03-RETURN PF07-BACKWARD PF08-FORWARD

Figure 31:
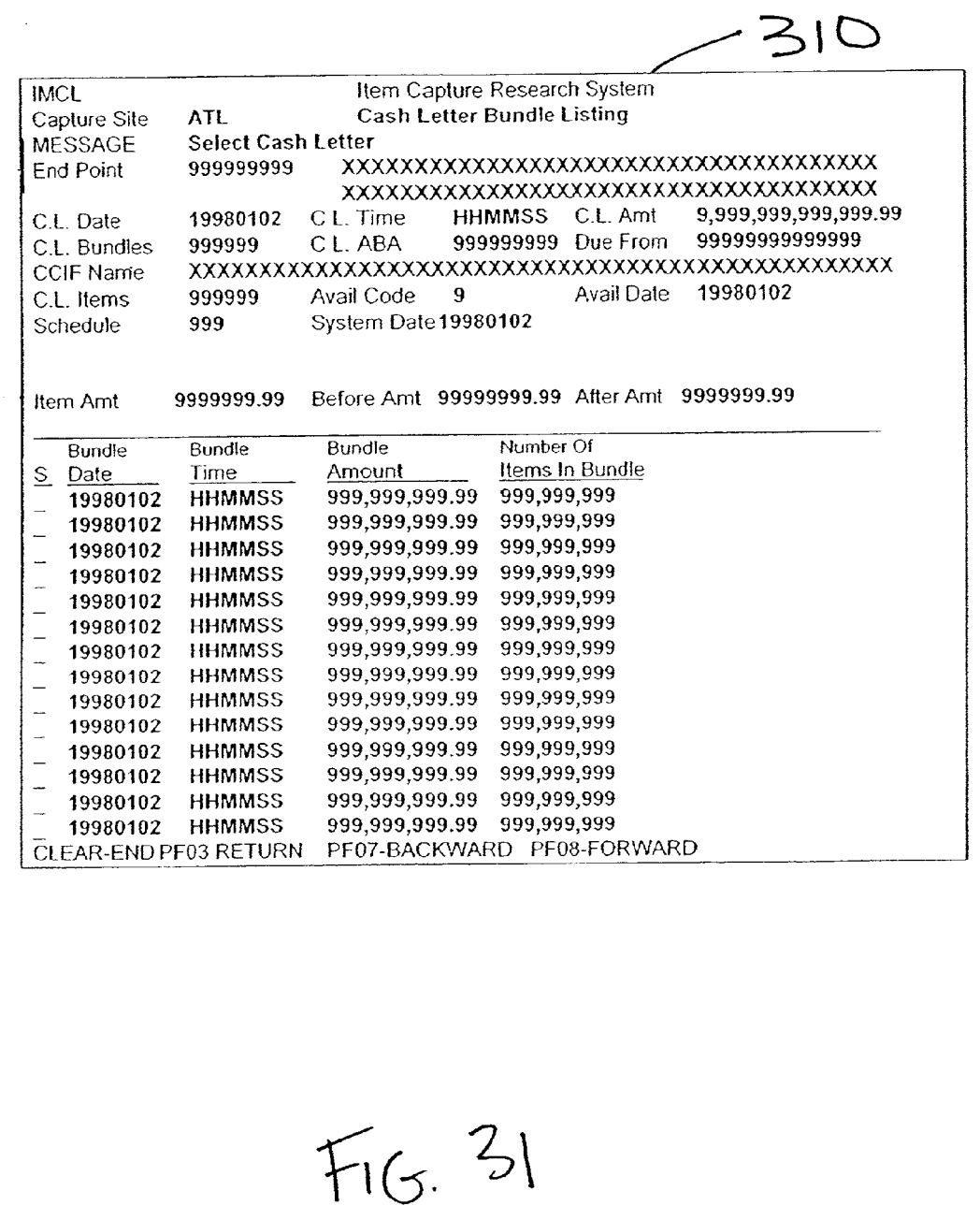

IMCL Item Capture Research System
Capture Site ATL Cash Letter Bundle Listing
MESSAGE Select Cash Letter
End Point 999999999 XXXXXXXXXXXXXXXXXXXXXXXXXXXXXXXXXXXXXXX
XXXXXXXXXXXXXXXXXXXXXXXXXXXXXXXXXXXXXXX
C.L. Date 19980102 C L. Time HHMMSS C.L. Amt 9,999,999,999,999.99
C.L. Bundles 999999 C L. ABA 999999999 Due From 999999999999999
CCIF Name XXXXXXXXXXXXXXXXXXXXXXXXXXXXXXXXXXXXXXXXXXXXXXXXXXXX
C.L. Items 999999 Avail Code 9 Avail Date 19980102
Schedule 999 System Date 19980102

Item Amt 9999999.99 Before Amt 99999999.99 After Amt 9999999.99

| S | Bundle Date | Bundle Time | Bundle Amount | Number Of Items In Bundle |
|---|---|---|---|---|
| _ | 19980102 | HHMMSS | 999,999,999.99 | 999,999,999 |
| _ | 19980102 | HHMMSS | 999,999,999.99 | 999,999,999 |
| _ | 19980102 | HHMMSS | 999,999,999.99 | 999,999,999 |
| _ | 19980102 | HHMMSS | 999,999,999.99 | 999,999,999 |
| _ | 19980102 | HHMMSS | 999,999,999.99 | 999,999,999 |
| _ | 19980102 | HHMMSS | 999,999,999.99 | 999,999,999 |
| _ | 19980102 | HHMMSS | 999,999,999.99 | 999,999,999 |
| _ | 19980102 | HHMMSS | 999,999,999.99 | 999,999,999 |
| _ | 19980102 | HHMMSS | 999,999,999.99 | 999,999,999 |
| _ | 19980102 | HHMMSS | 999,999,999.99 | 999,999,999 |
| _ | 19980102 | HHMMSS | 999,999,999.99 | 999,999,999 |
| _ | 19980102 | HHMMSS | 999,999,999.99 | 999,999,999 |
| _ | 19980102 | HHMMSS | 999,999,999.99 | 999,999,999 |
| _ | 19980102 | HHMMSS | 999,999,999.99 | 999,999,999 |

CLEAR-END PF03 RETURN PF07-BACKWARD PF08-FORWARD

Figure 32:
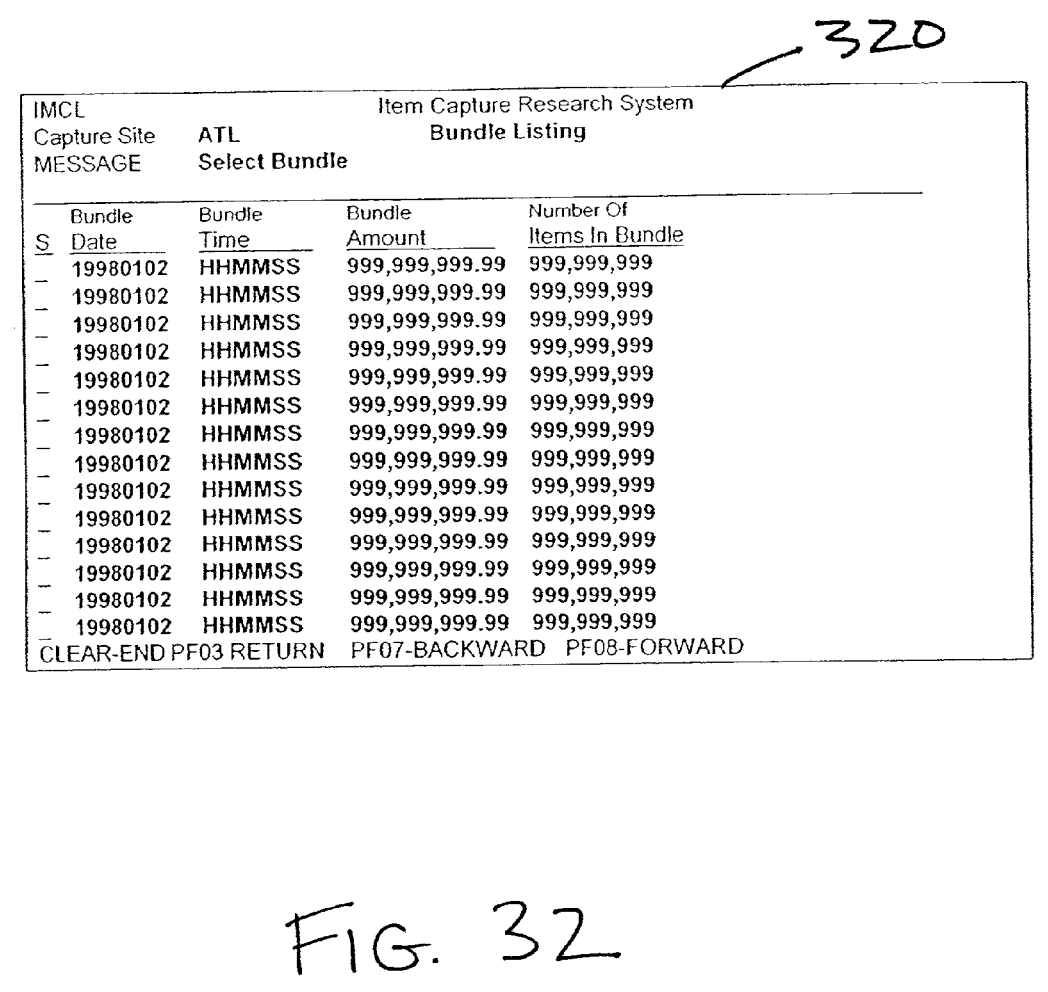

IMCL Item Capture Research System
Capture Site ATL Bundle Listing
MESSAGE Select Bundle

| S | Bundle Date | Bundle Time | Bundle Amount | Number Of Items In Bundle |
|---|---|---|---|---|
| _ | 19980102 | HHMMSS | 999,999,999.99 | 999,999,999 |
| _ | 19980102 | HHMMSS | 999,999,999.99 | 999,999,999 |
| _ | 19980102 | HHMMSS | 999,999,999.99 | 999,999,999 |
| _ | 19980102 | HHMMSS | 999,999,999.99 | 999,999,999 |
| _ | 19980102 | HHMMSS | 999,999,999.99 | 999,999,999 |
| _ | 19980102 | HHMMSS | 999,999,999.99 | 999,999,999 |
| _ | 19980102 | HHMMSS | 999,999,999.99 | 999,999,999 |
| _ | 19980102 | HHMMSS | 999,999,999.99 | 999,999,999 |
| _ | 19980102 | HHMMSS | 999,999,999.99 | 999,999,999 |
| _ | 19980102 | HHMMSS | 999,999,999.99 | 999,999,999 |
| _ | 19980102 | HHMMSS | 999,999,999.99 | 999,999,999 |
| _ | 19980102 | HHMMSS | 999,999,999.99 | 999,999,999 |
| _ | 19980102 | HHMMSS | 999,999,999.99 | 999,999,999 |
| _ | 19980102 | HHMMSS | 999,999,999.99 | 999,999,999 |

CLEAR-END PF03 RETURN PF07-BACKWARD PF08-FORWARD

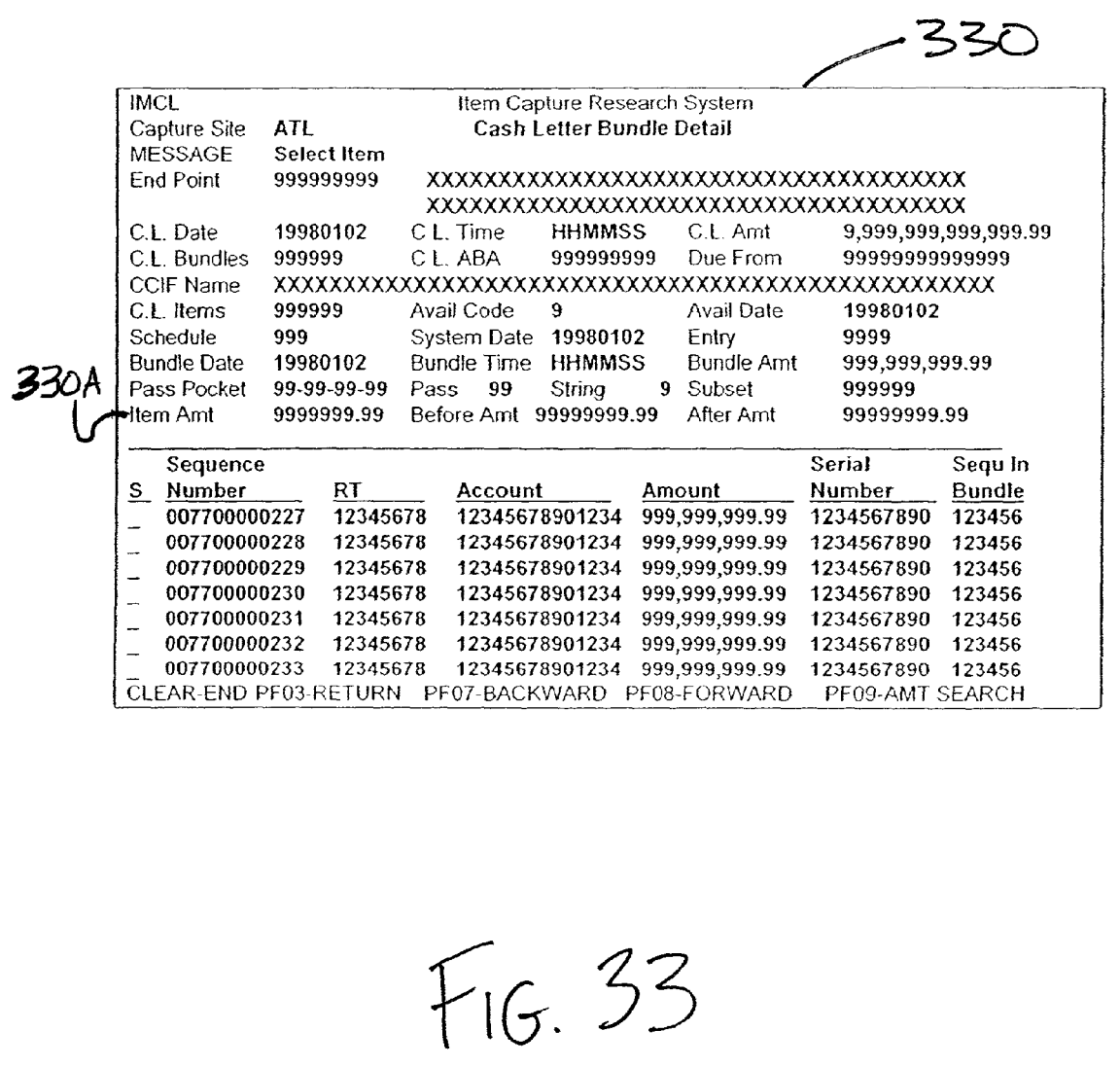

IMCL Item Capture Research System

Capture Site ATL Cash Letter Bundle Detail

MESSAGE Select Item

End Point 999999999 XXXXXXXXXXXXXXXXXXXXXXXXXXXXXXXXXXXXXX
XXXXXXXXXXXXXXXXXXXXXXXXXXXXXXXXXXXXXX

| | | | | | |
|---|---|---|---|---|---|
| C.L. Date | 19980102 | C L. Time | HHMMSS | C.L. Amt | 9,999,999,999,999.99 |
| C.L. Bundles | 999999 | C L. ABA | 999999999 | Due From | 99999999999999 |
| CCIF Name | XXXXXXXXXXXXXXXXXXXXXXXXXXXXXXXXXXXXXXXXXXXXXXXXXX | | | | |
| C.L. Items | 999999 | Avail Code | 9 | Avail Date | 19980102 |
| Schedule | 999 | System Date | 19980102 | Entry | 9999 |
| Bundle Date | 19980102 | Bundle Time | HHMMSS | Bundle Amt | 999,999,999.99 |
| Pass Pocket | 99-99-99-99 | Pass 99 | String 9 | Subset | 999999 |
| Item Amt | 9999999.99 | Before Amt | 99999999.99 | After Amt | 99999999.99 |

330A

| S | Sequence Number | RT | Account | Amount | Serial Number | Sequ In Bundle |
|---|---|---|---|---|---|---|
| _ | 007700000227 | 12345678 | 12345678901234 | 999,999,999.99 | 1234567890 | 123456 |
| _ | 007700000228 | 12345678 | 12345678901234 | 999,999,999.99 | 1234567890 | 123456 |
| _ | 007700000229 | 12345678 | 12345678901234 | 999,999,999.99 | 1234567890 | 123456 |
| _ | 007700000230 | 12345678 | 12345678901234 | 999,999,999.99 | 1234567890 | 123456 |
| _ | 007700000231 | 12345678 | 12345678901234 | 999,999,999.99 | 1234567890 | 123456 |
| _ | 007700000232 | 12345678 | 12345678901234 | 999,999,999.99 | 1234567890 | 123456 |
| _ | 007700000233 | 12345678 | 12345678901234 | 999,999,999.99 | 1234567890 | 123456 |

CLEAR-END PF03-RETURN PF07-BACKWARD PF08-FORWARD PF09-AMT SEARCH

FIG. 33

```
IMCL                     Item Capture Research System
Capture Site   ATL          Cash Letter Bundle Detail
MESSAGE        Select Item
End Point      999999999  XXXXXXXXXXXXXXXXXXXXXXXXXXXXXXXXXX
                          XXXXXXXXXXXXXXXXXXXXXXXXXXXXXXXXXX
C.L. Date      19980102   C.L. Time    HHMMSS    C.L. Amt        9,999,999,999,999.99
C.L. Bundles   999999     C.L. ABA     999999999 Due From        99999999999999
CCIF Name      XXXXXXXXXXXXXXXXXXXXXXXXXXXXXXXXXXXXXXXXXXXXXX
C.L. Items     999999     Avail Code   9         Avail Date      19980102
Schedule       999        System Date  19980102  Entry           9999
Bundle Date    19980102   Bundle Time  HHMMSS    Bundle Amt      999,999,999.99
Pass Pocket    99-99-99-99 Pass  99    String  9 Subset          999999

Item Sequence Number    007600000019
Item Type               TRN
Item RT                 123456789
Item Account            99999999999999
Item Amount             999,999,999.99
Item Serial             999999999
Item PC                 99
Item Sequence In Bundle 999999999999
Return                  99

CLEAR-END PF03-RETURN   PF11-ALL ITEMS
```

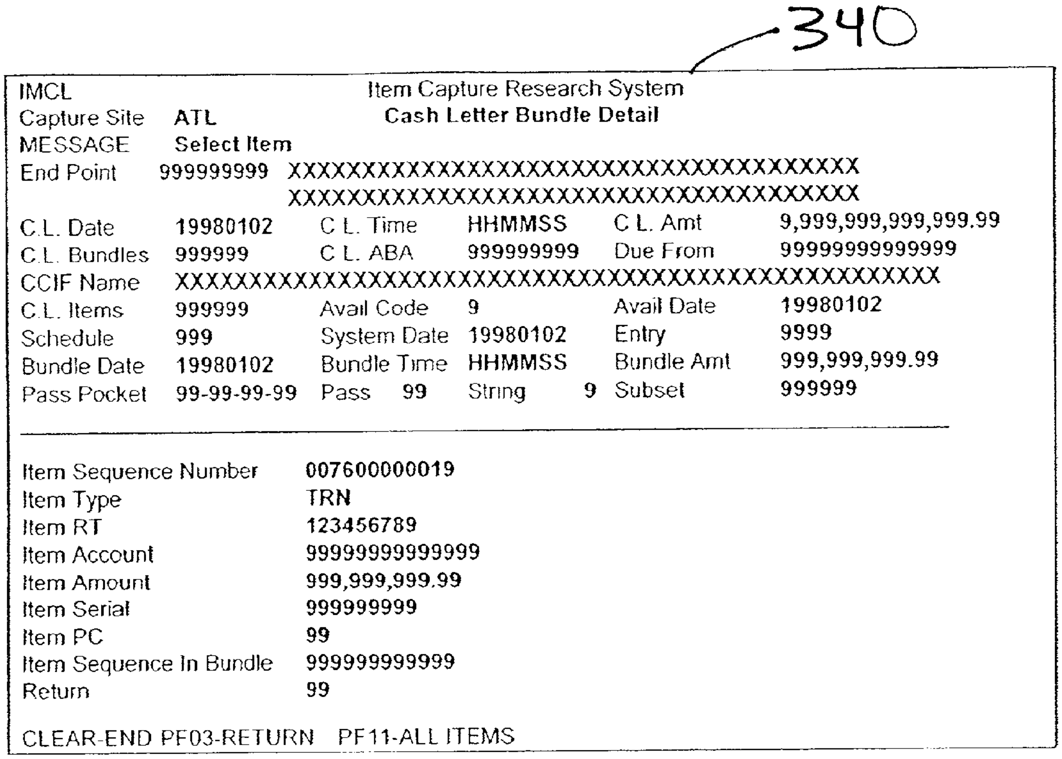

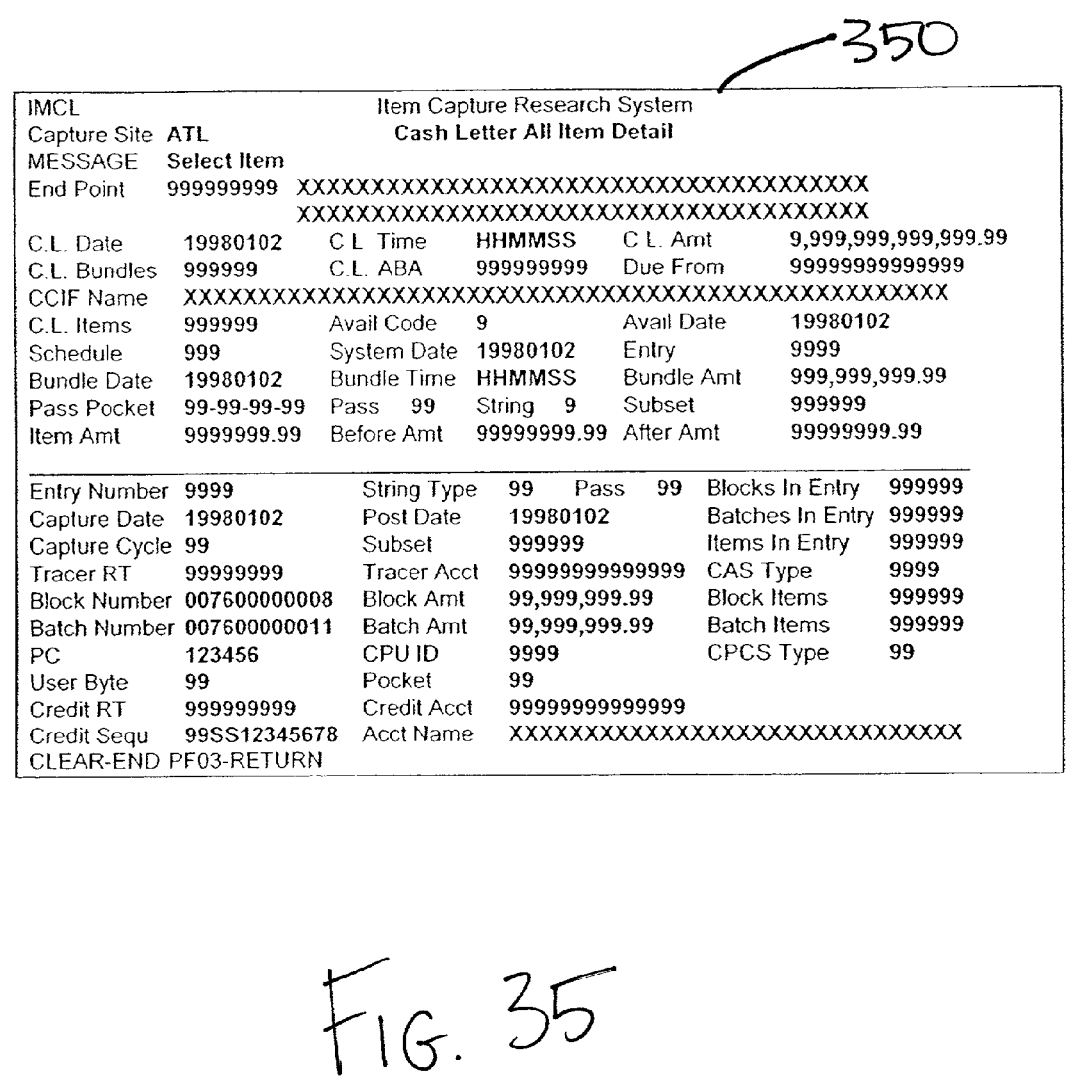

IMCL — Item Capture Research System

Capture Site ATL — Cash Letter All Item Detail

MESSAGE Select Item

End Point 999999999 XXXXXXXXXXXXXXXXXXXXXXXXXXXXXXXXXXXXXXXX XXXXXXXXXXXXXXXXXXXXXXXXXXXXXXXXXXXXXXXX

| | | | | | |
|---|---|---|---|---|---|
| C.L. Date | 19980102 | C L Time | HHMMSS | C L. Amt | 9,999,999,999,999.99 |
| C.L. Bundles | 999999 | C.L. ABA | 999999999 | Due From | 99999999999999 |
| CCIF Name | XXXXXXXXXXXXXXXXXXXXXXXXXXXXXXXXXXXXXXXXXXXXXXXXXXXXXX | | | | |
| C.L. Items | 999999 | Avail Code | 9 | Avail Date | 19980102 |
| Schedule | 999 | System Date | 19980102 | Entry | 9999 |
| Bundle Date | 19980102 | Bundle Time | HHMMSS | Bundle Amt | 999,999,999.99 |
| Pass Pocket | 99-99-99-99 | Pass 99 | String 9 | Subset | 999999 |
| Item Amt | 9999999.99 | Before Amt | 99999999.99 | After Amt | 99999999.99 |

| | | | | | |
|---|---|---|---|---|---|
| Entry Number | 9999 | String Type | 99 Pass 99 | Blocks In Entry | 999999 |
| Capture Date | 19980102 | Post Date | 19980102 | Batches In Entry | 999999 |
| Capture Cycle | 99 | Subset | 999999 | Items In Entry | 999999 |
| Tracer RT | 99999999 | Tracer Acct | 99999999999999 | CAS Type | 9999 |
| Block Number | 007600000008 | Block Amt | 99,999,999.99 | Block Items | 999999 |
| Batch Number | 007600000011 | Batch Amt | 99,999,999.99 | Batch Items | 999999 |
| PC | 123456 | CPU ID | 9999 | CPCS Type | 99 |
| User Byte | 99 | Pocket | 99 | | |
| Credit RT | 999999999 | Credit Acct | 99999999999999 | | |
| Credit Sequ | 99SS12345678 | Acct Name | XXXXXXXXXXXXXXXXXXXXXXXXXXXXXXXXXX | | |

CLEAR-END PF03-RETURN

FIG. 35

ITEM CAPTURE RESEARCH SYSTEM

CROSS REFERENCE TO RELATED APPLICATIONS

This application is based on and claims priority to U.S. Provisional Patent Application No. 60/197,784, filed Apr. 14, 2000, entitled ITEM CAPTURE RESEARCH SYSTEM, the entire disclosure of which is hereby incorporated by reference.

FIELD OF THE INVENTION

The present invention generally relates to an item capture research system, and more specifically, to a method of item capture whereby information is collected on financial items, e.g., checks, as they progress through the various phases of capture, posting, and backend reporting while allowing storage within a single system that may be accessed by users at all locations within the organization.

BACKGROUND OF THE INVENTION

Systems for archiving transaction data and image data generated by check processing operations performed by financial institutions are well known. By transaction data, we mean not only the information encoded on the check itself, magnetically or otherwise, but also the information about the capture process and the handling of the item subsequent to the capture process. Image data, of course, refers to an image of the check itself, or other financial document of which an image is captured.

Typically, such archive systems are based on relational database management systems such as DBII, Oracle or Informix. Large and even medium size financial institutions can process hundreds of thousands, if not millions, of checks (or items) in a single day. The information captured must be stored for several years so that information relating to an item can be retrieved in connection with various banking operations, such as retail customer service or treasury or cash management services for commercial customers. The costs associated with storing such a large volume of information are very high. Thus, there is a need for a system that provides cost effective, long-term storage of transaction data and image data generated in connection with the item capture process.

As discussed above, financial institutions generate vast amounts of transaction data and image data in connection with check or item processing. Item research as it relates to retrieving such transaction and image data for use by retail or commercial customers of the financial institution, as well as operational personnel, usually to determine the occurrence or non-occurrence of certain events, such as presentment, payment or clearance of an item.

Item research that is executed at multiple financial institution locations and performed across multiple systems is time and resource intensive. Items are typically captured on at least two different capture platforms (e.g., Check Processing Control System and ImageMark) and capture sites are typically dispersed geographically. As a result, substantial human resources are required to research items because multiple systems need to be accessed. In addition, the amount of time to research an item and deliver a hardcopy (e.g., microfilm-based copy) of the item can take hours and even days. Moreover, historical information on these disparate systems is limited. This drain on resources ultimately results in poor customer service.

Previously available commercial systems, e.g., the Vector 11 System available from Sterling Commerce of Columbus, Ohio, receive all items from the Check Processing Control System ("CPCS") and sort them by a sequence number. There are no interfaces to direct deposit account ("DDA") or cash letter systems. Items cannot be extracted by entry, block or batch. Entry, block and batch summarization is also not supported. The Vector 11 System uses a Customer Information Control System ("CICS") interface, but does not support a callable interface that can be accessed through a variety of host and PC application development languages. Thus, there is a need for an archive system that provides an integrated, efficient and quick item research system.

SUMMARY OF THE INVENTION

A system and method for item capture research, comprises an item capture subsystem, an image archive subsystem system, a transaction data archive system having a multiple data structures, and a research engine.

The image capture subsystem includes a document processor, an image camera and an associator.

The image archive subsystem is comprised of on-us items image database and a transit items image database. The on-us items image database stores information about items drawn on a financial institution that is processing the item. It includes the following information about on-us items: the bank ID number, account number and image date. The transit items image database stores information about stores information about items drawn on a financial institution other than the one that is processing the item. It includes the following information about on-us items: the sorter ID number, the image date, and the sequence number. The image data archive subsystem also includes a white paper image database, which stores information about items other than checks, e.g., deposit slips, and includes information about the account number and the image date.

The image archive subsystem also includes an image data index, which is an index to the image data stored in the image databases, and stores information about the image date, a sorter ID number, a sorter cycle, a sequence number and a database identifier.

The multiple data structures of the transaction data archive subsystem include (i) an on-us items data structure, (ii) an all items data structure, and (iii) a cash letter items data structure.

The on-us items data structure includes an on-us items file, an on-us items archive file and an on-us items archive file index. The on-us items file includes MICR codeline data, a posted amount, a bank ID number, an account number and a posting date. The MICR codeline data includes a routing/transit number, an account number, a serial number, a process control field, a sequence number, a payee account number, a transaction code and an import source. The on-us items file is a VSAM file and is stored online on DASD.

The on-us items archive file includes the same information as in the on-us items file, although the on-us items archive file is stored offline on magnetic tape.

The on-us items archive file index is an index to the on-us items archive file. The on-us items archive index is a VSAM file, which is stored online of DASD.

The all items data structure includes an all entries file, an all items file, and all items archive file and an all items archive file index.

The all entries file includes information about the capture site, capture date, and entry number for an item. The entry number consists of block information, which, in turn, consists of a block sequence number and a block amount. The block information includes batch information, which, in turn, includes a batch sequence number and a batch amount. The all entries file is a VSAM file and is stored online on DASD.

The all items file includes item information, such as MICR codeline data, an item amount, and an item sequence number. The all items file is a VSAM file, which is stored online on DASD.

The all items archive file has the same structure as the all items file, and is a VSAM file that is stored offline on magnetic tape.

The all items archive index is an index to the all items archive file and is a VSAM file that is stored online on DASD.

The cash letter items data structure includes a cash letter file, a bundle items file, a bundle items archive file and a bundle items archive file index.

The cash letter file includes information about an end point identifier, a cash letter date, a cash letter amount and a cash letter time. The cash letter file is a VSAM file that is stored online on DASD.

The bundle items file includes information about a bundle amount, a bundle time, and a bundle date. A bundle includes at least one item, which is comprised of MICR codeline data and an item amount. The bundle items file is a VSAM file that is stored online on DASD.

The bundle items archive file has the same data structure as the bundle items file. It is a VSAM file that is stored offline on magnetic tape.

The bundle items archive file index is an index to the bundle items archive file. The bundle items archive index is a VSAM file, stored online on DASD.

The research engine receives an item request and directs a response to the item request, and includes a request interpreter, a request director and a request processor. The request interpreter is an all items request interpreter, which is used to search the all items data structure, or a cash letter request interpreter, which is used to search the cash letter items data structure. The request director directs a search request to the request processor, such as an all entries request processor, an all items request processor, a cash letter request processor or a cash letter items request processor.

These and other aspects of the present invention will become apparent to those skilled in the art after a reading of the following description of the preferred embodiments.

BRIEF DESCRIPTION OF THE DRAWINGS

FIG. 6 is an illustration of the record format of the all entries master file and the all entries archive file;

FIG. 7 is a sample all entries master file;

FIG. 8 is an illustration of the format of the all items master file and the all items archive file;

FIG. 9 is a sample all items master file;

FIG. 10 is an illustration of the format of the cash letter master file and the cash letter archive file;

FIG. 11 is a sample cash letter master file;

FIG. 12 is an illustration of the format of the bundle item master file and the bundle item archive file;

FIG. 13 is a sample bundle item master file;

FIG. 20 is an illustration of the Entry Listing Screen of the present invention;

FIG. 21 is an illustration of the Block/Batch Listing Screen of the present invention;

FIG. 22 is an illustration of the Block/Batch Detail Screen of the present invention;

FIG. 23 is an illustration of the On-Us Item Detail Screen of the present invention;

FIG. 24 is an illustration of the Transit Item Detail Screen of the present invention;

FIG. 25 is an illustration of the Transit Item Cash Letter Detail Screen of the present invention;

FIG. 26 is an illustration of the Transit Item Cash Letter Detail Screen of the present invention;

FIG. 27 is an illustration of the Specific Item Search Listing Screen of the present invention;

FIG. 28 is an illustration of the Specific Item Search Listing Screen with CCIF data of the present invention;

FIG. 30 is an illustration of the Cash Letter Listing Screen of the present invention;

FIG. 31 is an illustration of the Cash Letter Bundle Listing Screen of the present invention;

FIG. 32 is an illustration of the Bundle Listing Screen of the present invention;

FIG. 33 is an illustration of the Cash Letter Bundle Detail Screen of the present invention;

FIG. 34 is an illustration of the Cash Letter Item Detail Screen of the present invention; and FIG. 35 is an illustration of the Cash Letter All Item Detail Screen of the present invention;

DETAILED DESCRIPTION OF PREFERRED EMBODIMENTS

Figure 1:
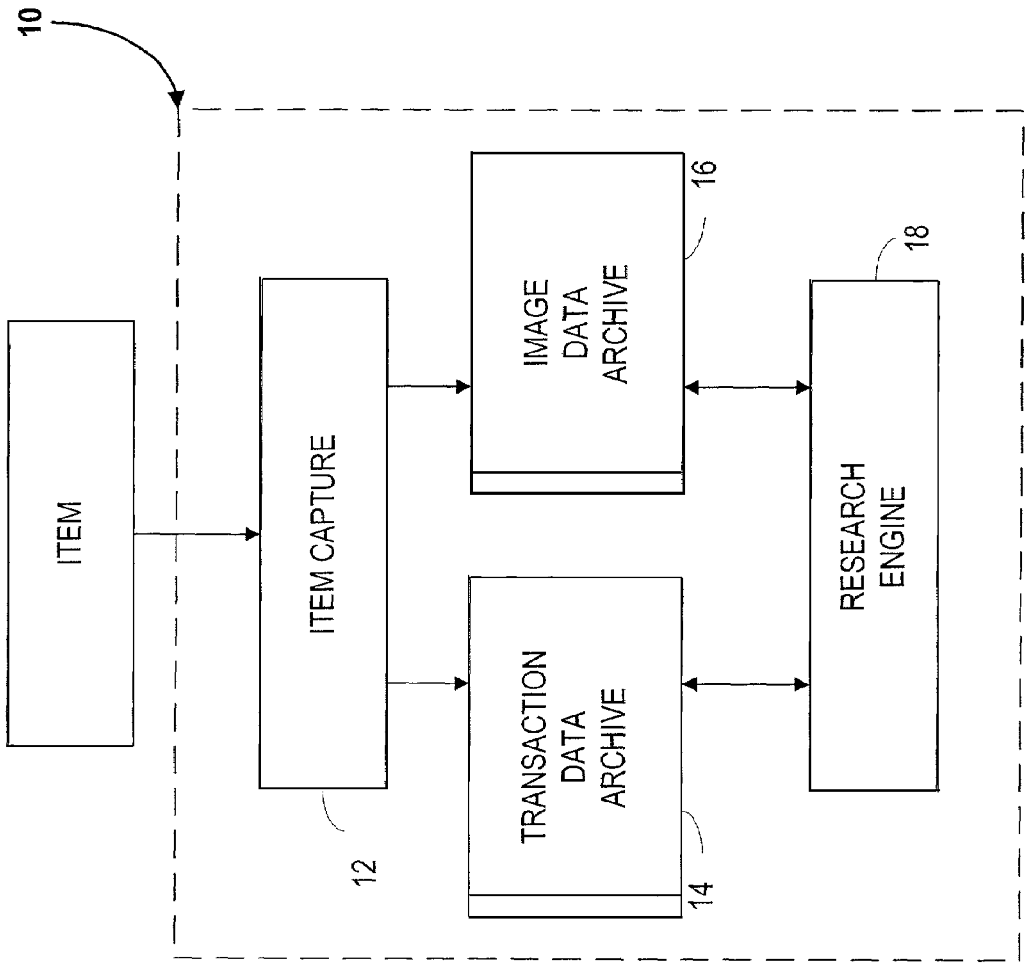
FIG. 1 is a diagram of the item capture research system of the present invention.

FIG. 1 is a diagram illustrating the main components of the system of the present invention. The system 10 integrates the capture, posting and research processes into a single system that quickly delivers item information and the associated image of the corresponding item or document from anywhere in a business organization, e.g., a financial institution, regardless of the user's physical location.

System 10 Overview

As shown in FIG. 1, the system 10 includes an item capture subsystem 12, a transaction data archive subsystem 14 and an image data archive subsystem 16. Items, such as checks, white paper, and proof of deposit documents are received by the item capture subsystem 12. Transaction data relating to the item is extracted and stored in the transaction data archive subsystem 14. Likewise, image data, including an image of the item, is extracted and stored in the image data archive subsystem 16. The system 10 also includes a research engine 18, which receives and responds to requests for transaction and image data stored in the transaction data archive 14 and the image data archive 16.

Both the transaction data archive 14 and the image data archive 16 use matrix structures for indexing data. Such a structure is advantageous in managing the large amounts that are captured and stored in high volume check processing operations. Such a structure does not require the use of an additional database management system (either relational or hierarchical) to support the database structures, thus requiring less processing resources and attendant support personnel. Also, such a structure can accommodate high volume import and data loading associated with high volume check processing. In addition, maintenance and/or reorganization of the data files can be achieved with minimal impact on archive availability. Such a structure allows for data loading and backup without negatively affecting image or data retrievals. Finally, the structure is flexible and therefore easily modifiable.

Item Capture Subsystem 12

Figure 2:
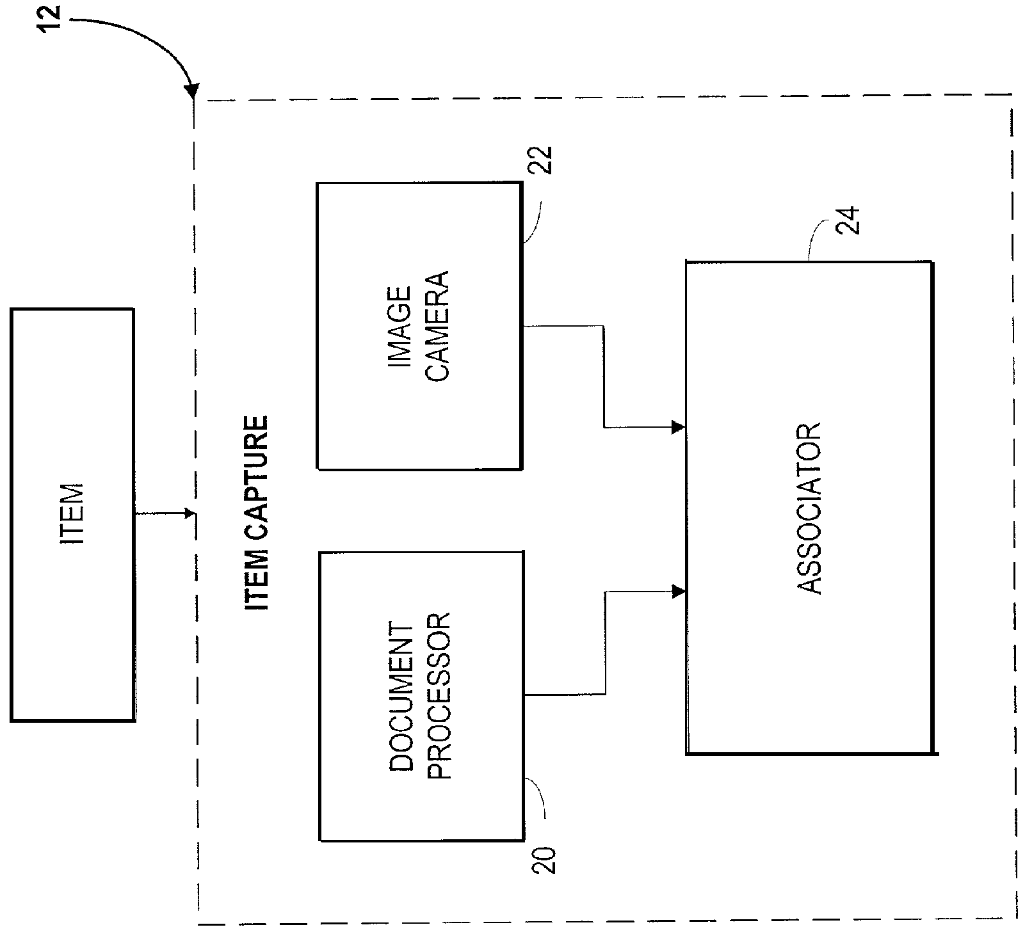
FIG. 2 is a diagram of the item capture subsystem of the present invention.

FIG. 2 shows the item capture subsystem 12 in more detail. An exemplary item capture subsystem 12 is the Check Processing Control System ("CPCS") available from International Business Machines ("IBM") of Armonk, N.Y. The item capture subsystem 12 extracts CPCS strings from the captured item, including, input strings (I-strings), merged strings (M-strings), 99M strings, input creation files (ICRE) and master creation files (MCRE).

An I-string is a string of data that is captured during the prime pass entry. An M-string represents the merging of data and images from the prime pass I-string with corrected reject data. Reports that result from the M-string allow for reconciliation and balance input, which ensures that all items are captured. Once the reject repair process is completed, the M-string becomes a 99M-string, which is a fully balanced string of items. An ICRE is a concatenation of all the 99M-strings for a period of time for a particular capture site, depending the organization's balancing procedures. A MCRE is a subset of the ICRE, and it represents all transit items.

Images also can be imported using, for example, the ImageMark Proof of Deposit system, which is available from NCR Corporation of Dayton, Ohio.

Check images also can be imported from the BancTec Retail Lockbox System, which is available from BancTec, Inc. of Irving, Tex.

White paper images and check transactional data also can be imported from the RemitVision Lockbox capture system, available from Alysis Technologies of Emeryville, Calif.

Referring to FIG. 2, preferably, the item capture subsystem 12 includes a document processor 20, an image camera 22 and an associator 24. While the document processor 20 and the image camera 22 are shown as separate components for purposes of illustration, these two components may be combined into the same hardware/software platform.

Document Processor 20

An exemplary document processor 20 is an IBM 3890/XP Series document processor, also available from IBM. Such a document processor is a high-speed, high-volume document processor that reads magnetically-inscribed documents or optical-character documents. As items are captured, the document processor 20 creates an I-string, which includes every document read by the document processor, including control documents and rejected documents. Each record contains related information, such as the pocket selected. The I-string also includes internally-generated control records.

Image Camera 22

An exemplary image camera 22 is available with the EBM 3890/XP Series document processor, which is available from IBM. Images captured by the item capture subsystem 12 are sent to the archive subsystem 16, where they are stored and managed.

Associator 24

The associator 24 receives transaction data for an item from the document processor 20 and image data for the same item from the image camera 22 and associates the item's transaction data with the corresponding image and image data for that item.

Transaction Data Archive Subsystem 14

Figure 3:
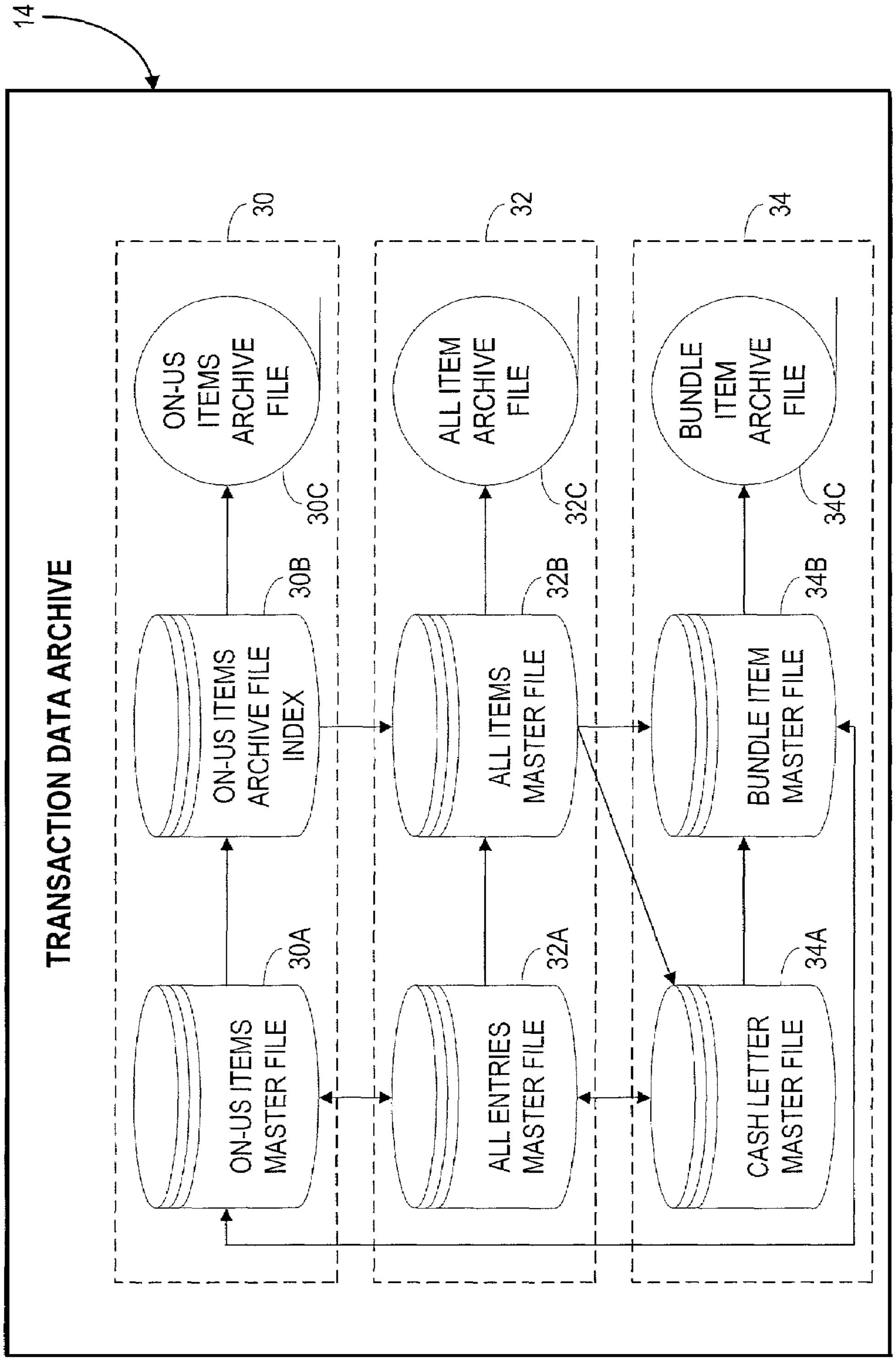
FIG. 3 is a diagram of the transaction data archive subsystem of the present invention.

FIG. 3 shows the transaction data archive 14 in more detail. The transaction data archive is comprised of three separate, integrated data structures, namely, an on-us items data structure 30, an all items data structure 32 and a cash letter items data structure 34. Each of these data structures will be discussed in more detail below.

On-Us Items Data Structure 30

Returning to FIG. 3, the on-us items data structure 30 includes an on-us items master file 30_a_, an on-us items archive file index 30_b_ and an on-us items archive file 30_c_. The on-us items data structure 30 contains all data for on-us items, which are checks or other financial documents drawn on the financial institution that is processing them. Each of these components of the on-us items data structure 30 will be discussed in more detail below.

On-Us Items Master File 30_a_

The on-us items master file 30_a_ is comprised of multiple virtual storage access method (VSAM), keyed-sequence data set (KSDS) files by commercial account and retail account. A VSAM file is a file management system used on IBM mainframes. VSAM speeds up access to data in files by using an inverted index (called a B+tree) of all records added to each file. Many legacy software systems use VSAM to implement database systems, which are called data sets. A KSDS file is a VSAM file or data set whose records are loaded in key sequence and controlled by an index.

Figure 4:
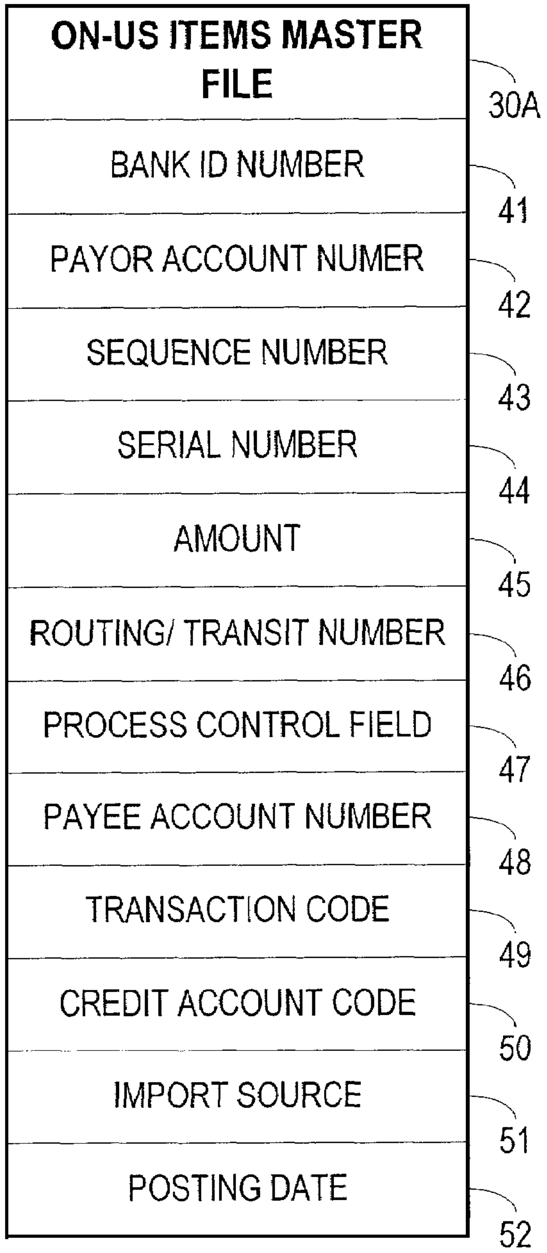
FIG. 4 is an illustration of the record format for the on-us items master file and the on-us items archive file.

As illustrated in FIG. 4, a record in the on-us items master file 30_a_ includes the following fields: Bank ID Number 41, Account Number 42, Sequence Number 43, Serial Number 44, Amount 45, Routing/Transit Number 46, Process Control Field 47, Payee Account Number 48, Transaction Code 49, Credit Account Code 50, Import Source 51 and Posting Date 52. The primary key for the on-us items master file 30_a_ is comprised of the Bank ID Number 41, Payor Account Number 42 and Sequence Number 43. The alternate key is comprised of Serial Number 44 and Amount 45. The Bank ID Number 41, the Account Number 42 the Serial Number 44 and the Process Control Field 47 are data elements of the MICR codeline.

On-Us Items Archive File Index 30_b_

Figure 5:
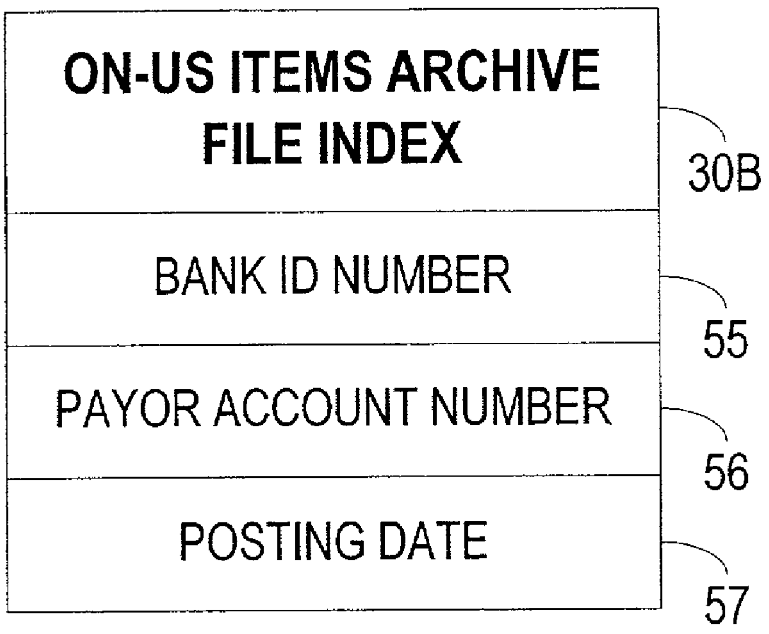
FIG. 5 is an illustration of the record format of the on-us items archive file index.

As illustrated in FIG. 5, a record in the on-us items archive index file 30_b_ includes the following fields: Bank ID Number 55, Payor Account Number 56 and Posting Date 57. The key for the On-Us Items Archive File Index 30_b_ are the same three fields, which are for retrieval of item information based on the user's knowledge of the customer account number. Such a structure obviates the need to search the all items archive file, which is a considerably larger file, thereby saving time and money in item research.

On-Us Items Archive File 30*c*

The fields in a record in the on-us items archive file 30*c* are the same as those for a record in the on-us items master file 30*a*.

All Items Data Structure 32

Returning to FIG. 3, the all items data structure 32 is comprised of an all entries master file (AEMF) 32*a*, an all items master file (AIMF) 32*b*, and an all items archive file (AIAF) 32*c*.

All Entries Master File 32*a*

The AEMF 32*a* is comprised of multiple virtual access storage method VSAM, KSDS files by CPCS entity, i.e., capture site, and month.

FIG. 6 shows the fields in a record (AEMF-RECORD) in the AEMF 32*a*. As shown in FIG. 6, the key for the AEMF 32*a* is comprised of the CPCS entity, i.e., capture site (AEMF-KEY-APPL-SITE), capture date (AEMF-KEY-APPL-DATE), capture sorter (AEMF-KEY-CAPT-SORT), entry number (AEMF-KEY-CAPT-ENTRY-NUMB), and record number (AEMF-KEY-CAPT-REC-NUMB). The record includes all of the block and batch data for an entry. Entries with more than 32K of data will use more than one AEMF record. The records contain the string data from the ICRE string header records and the capture sequence number range for the entry. It should be noted that the AEMF-BLOCK-DATA field will occur from 0 to 20 times depending on the value in the AEMF-ENTRY-NUMB-BLOCKS field.

FIG. 7 is a sample all entries master file.

All Items Master File 32*b*

The AIMF 32*b* is comprised of multiple VSAM, KSDS files by CPCS entity, i.e., capture site, and month. The AIMF 32*b* is contains data about all items captured by the item capture subsystem, both on-us items and transit items. The AIMF 32*b*, which archives all items in the order they were processed, facilitates deposit research and rebuilds of customer account statements.

FIG. 8 shows the fields in a record (AIMF-RECORD) in the AIMF 32*b*. As shown in FIG. 8, the key to the AIMF 32*b* is comprised of the CPCS entity (AIMF-KEY-APPL-SITE), capture date (AIMF-KEY-APPL-DATE), entry number (AEMF-KEY-ENTRY), batch sequence number (AIMF-KEY-LAST-SEQU), record number (AIMF-KEY-RECD-NUMB) and record type (AIMF-KEY-RECD-TYPE). The last sequence number on the record is set to the last sequence number relative to the sorter the batch was captured on. There is one logical AIMF record for each batch in the ICRE file. There are multiple AIMF records for batches that have more than 250 items. The records contain the batch key and one or more segments for each item in the batch. Each item record contains the item data, credit account data, cross reference data for on-us items and the cash letter data for transit items. It should be noted that the AIMF-ITEM field occurs 0 to 350 times, depending on the value in the AIMF-BATCH-NUMB-ITEMS field.

FIG. 9 is a sample all items master file.

The AIMF 32*b* is created from the ICRE, MCRE and cash letter system.

All Items Archive File 32*c*

The AIAF 32*c* is comprised of multiple NearArchive databases by CPCS entity. As is known to those skilled in the art, a NearArchive database is available from Storage Technology Corporation of Louisville, Colo. The AIAF 32*c* is used to store item data after it is migrated from the AIMF 34*b*. The All Entries Archive File (AEAF) 32*c* has the same record structure as the AIMF 32*b*.

As is known to those skilled in the art, there is an online index (not shown) to AIAF 32*c*. By online index, we mean that the index to the AIAF 32*c* is stored in a direct access storage device (DASD).

Cash Letter Data Structure 34

Returning to FIG. 3, the cash letter structure 34 is comprised of a cash letter master file (CLMF) 34*a*, a bundle item master file (BIMF) 34*b*, and a bundle item archive file (BIAF) 34*c*.

Cash Letter Master File 34*a*

The CLMF 34*a* is comprised of multiple VSAM, KSDS files by CPCS entity, i.e., capture site and month. The CLMF 34*a* contains information about all transit items captured by the item capture subsystem. Transit items are checks drawn on the financial institution by institutions other than the financial institution that is processing them. The CLMF 34*a*, which archives transit items in dispatched order, facilitates cash letter and kill bundle research and rebuilds.

FIG. 10 shows the fields in a record (CLMF-RECORD) in the CLMF 34*a*. As shown in FIG. 10, the key to the CLMF 34*a* is comprised of the CPCS entity (CLMF-KEY-CL-PROC-SITE), cash letter process date (CLMF-KEY-CL-PROC-DATE), cash letter system date (CLMF-KEY-SYST-DATE), end point (CLMF-KEY-CL-END-POINT), cash letter time (CLMF-KEY-CL-TIME), cash letter amount (CLMF-KEY-CL-AMNT) and ACLS record number (CLMF-KEY-ACLS-NUMB). The record stores all cash letter and bundle information. The records are based on the ACLS information. It should be noted that the CLMF-CL-BUNDLE-DATA field occurs 0 to 400 times, depending on the value in the CLMF-CL-NUMBER-BUNDLES field.

FIG. 11 is a sample cash letter master file.

Bundle Item Master File 34*b*

The BIMF 34*b* is comprised of multiple VSAM, KSDS files by CPCS entity, i.e., capture site, and month. The BIMF 34*b* is an index to each transit item in each bundle in each cash letter.

FIG. 12 shows the fields in a record (BIMF-RECORD) in the BIMF 34*b*. As shown in FIG. 12, the key to the BIMF 34*b* is comprised of the capture site (BIMF-VSM-KEY-APPL-SITE), capture date (BIMF-VSM-KEY-APPL-DATE), end point (BIMF-VSM-KEY-END-POINT), bundle date (BIMF-VSM-KEY-BUNDLE-DATE), bundle time (BIMF-VSM-KEY-BUNDLE-TIME) and bundle amount (BIMF-VSM-KEY-BUNDLE-AMNT). There is one logical BIMF record for each record in the MCRE file. There are multiple BIMF records for bundles that have more than 550 items. The record contains one or more segments for each item in the bundle.

FIG. 13 is a sample bundle item master file.

Bundle Item Archive File 34*c*

The BIAF 34*c* is comprised of multiple NearArchive databases by CPCS entity. The BIAF 34*c* is used to store cash letter data after it migrated from the BIMF 34*b*. The BIAF 34*c* has the same record structure as the BIMF 34*b*.

As is known to those skilled in the art, there is an online index (not shown) to BIAF 34*c*.

Transaction Data Archive Storage

As previously mentioned, preferably, index data is stored on a direct access storage device (DASD) for a period of one year. After one year, the index data is written to a long term, offline storage media, such as magnetic tape. By offline storage, we mean non-DASD storage, such as magnetic tape. Preferably, the index data is organized using archive objects. Preferably, the archive objects are created using the NearArchive software and object structures, which are available from Storage Technology Corporation of Louisville, Colo. The migration of the transaction data to magnetic tape is performed on a monthly basis so that the transaction data for a month can be restored when a retrieval request that spans that date range is performed.

Preferably, the on-us, all items and cash letter databases can have different storage rules and are archived to separate archive objects. A VSAM index file of relatively small size is maintained on DASD and points to the correct archive object on magnetic tape. A retrieval request specifies the data or data range and the system will resolve the archive object that needs to be restored in order to satisfy the retrieval request.

Image Data Archive Subsystem 16

Returning to FIG. 1, the system 10 further includes an image data archive subsystem 16. The image data archive subsystem 16 is shown in greater detail in FIG. 14.

Figure 14:
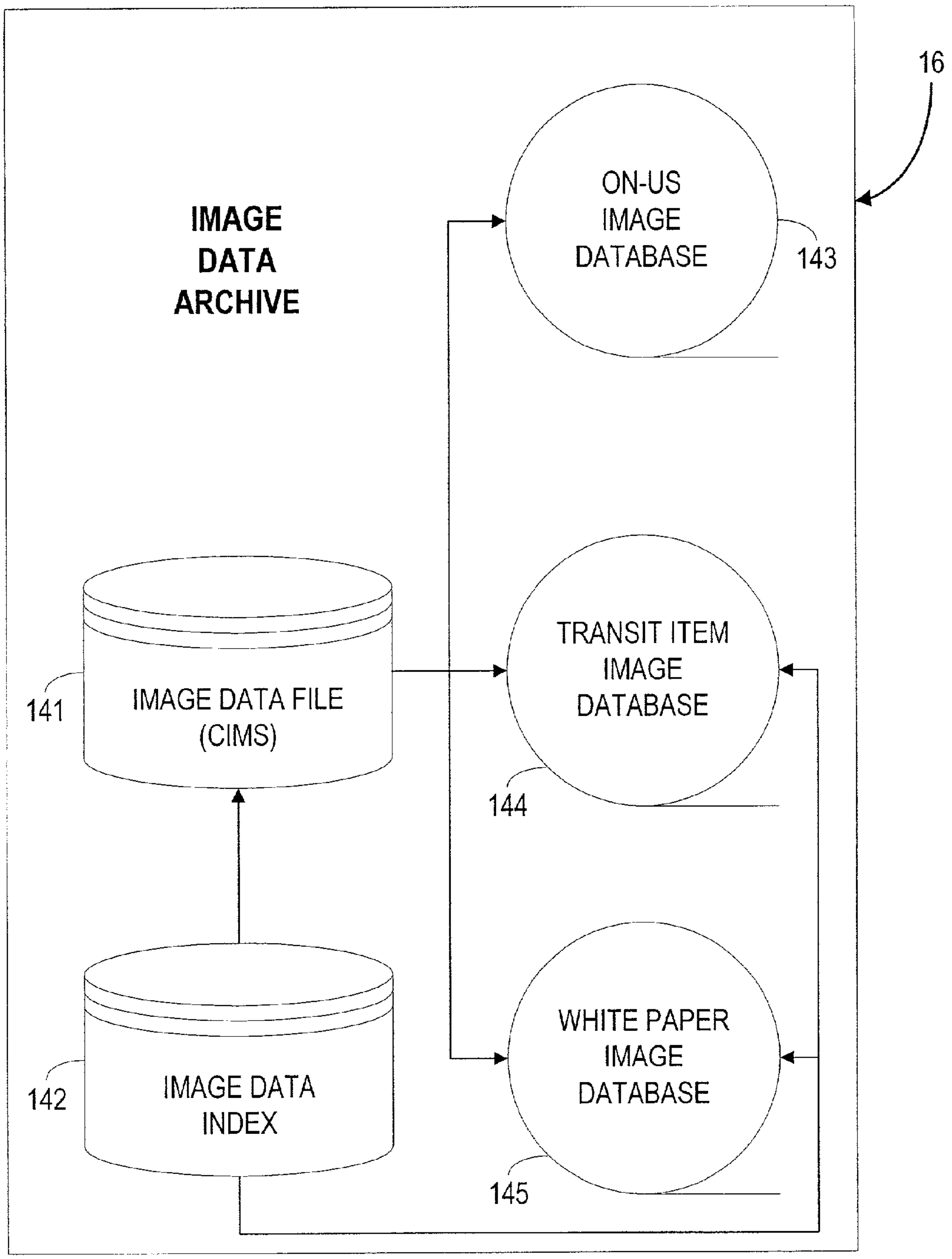
FIG. 14 is a diagram of the image data archive subsystem of the present invention.

As shown in FIG. 14, the image data archive subsystem 16 is comprised of image data file 141 and an image data index 142, which are stored in a DASD. The image data archive subsystem 16 is also comprised of an on-us item image database 143, a transit item image database 144 and a white paper image database 145.

Image Data File 141

Preferably, the image data file 141 is a CIMS database, which is available from Check Solutions of Memphis, Tenn. The image data file 141 is supported using the High Performance Transaction System ("HPTS") software available from IBM of Armonk, N.Y. The image data file 141 is comprised of directory files and data files. There are unique directory files by capture sorter and unique data files by capture entry. Preferably, on-us and lockbox image data is stored in DASD for 45 calendar days, while transit image data is stored in DASD for three calendar days.

Image Data Index 142

The image data index 142 is comprised of the following fields: Image Date, Sorter ID Number, Sorter Cycle, Sequence Number and Database Name.

On-Us Item Image Database 143

The on-us image database 143 is composed of multiple NearArchive tape databases by bank, commercial/retail application type, and account key range. On-us check, deposit and lockbox image data is stored in the on-us item image database 143.

Figure 15:
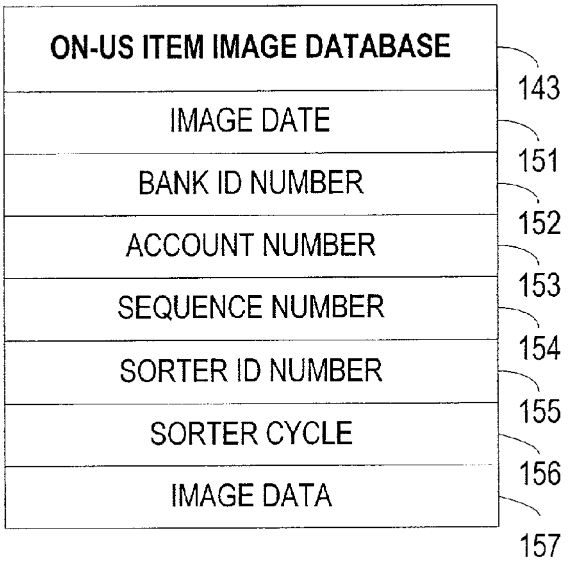
FIG. 15 is an illustration of the record format of the on-us image database.

FIG. 15 shows the following fields in a record in the on-us items image database 143: Image Date 151, Bank ID Number 152, Account Number, 153, Sequence Number 154, Sorter ID Number 155, Sorter Cycle 156 and Image Data 157. An image key is comprised of the following fields: Image Date 151, Sorter ID Number 155, Sorter Cycle 156 and Sequence Number 154.

Transit Item Image Database 144

The transit item image database 144 is comprised of multiple NearArchive tape databases by capture sorter. Transit item image data is stored in the transit item image database 144.

Figure 16:
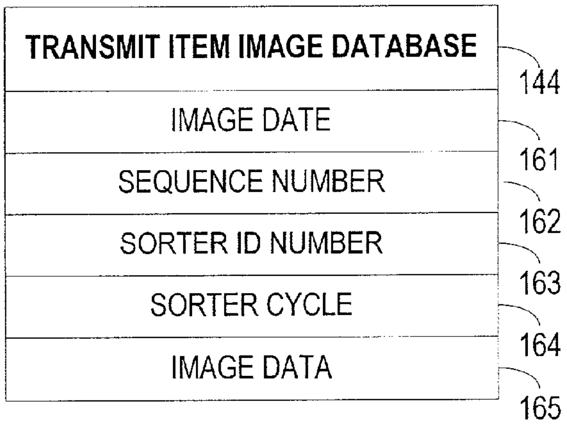
FIG. 16 is an illustration of the record format of the transit image database.

FIG. 16 shows the following fields in a record in the transit item image database 144: Image Date 161, Sequence Number 162, Sorter ID Number 163, Sorter Cycle 164 and Image Data 165. An image key is comprised of the following fields: Image Date 161, Sorter ID Number 163, Sorter Cycle 164 and Sequence Number 162.

White Paper Image Database 145

The white paper image database 145 is comprised of multiple NearArchive tape databases.

Figure 17:
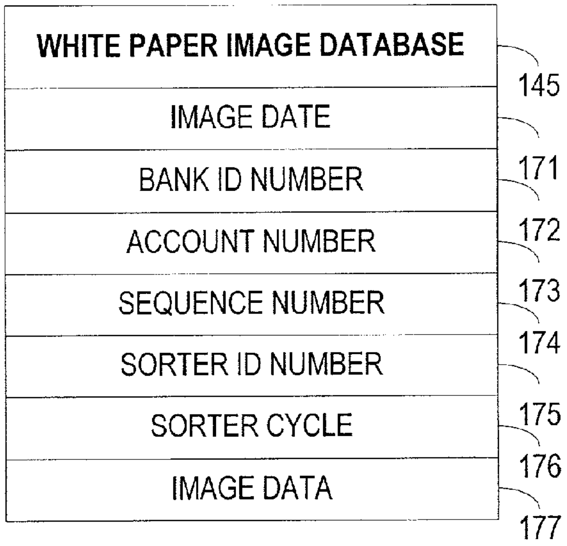
FIG. 17 is an illustration of the record format of the white paper image database.

FIG. 17 shows the fields for a record in the white paper image database 145: Image Date 171, Bank ID Number 172, Account Number 173, Sequence Number 174, Sorter ID Number 175, Sorter Cycle 176 and Image Data 177. An image key is comprised of the following fields: Image Date 171, Sorter ID Number 175, Sorter Cycle 176 and Sequence Number 174.

The Image Date is the date the image was captured. The Bank ID Number is the identification number of the bank or other financial institution association with the Account Number. The Account Number is the account number for the customer associated with the image. Sequence Number is the sequential number assigned to the item as it was captured by the sorter. Sorter ID Number is the number used to identify the sorter upon which the image was captured. Sorter Cycle is the cycle of the sorter upon which the image was captured. Image Data is the image in a digitized format of the item captured.

Image Storage

Image data is stored on DASD on a short term basis, which provides quick response. Preferably, the HPTS and CIMS database is used for DASD storage. The parameters for short term storage are stored in a control file, which specifies where images are stored and for how long. As discussed above, images can be classified as either on-us images or transit images, each of which has its own retention period. A third classification of images, white paper images, also can have its own retention period.

Images are stored on a long term basis on StorageTek 9840 drive and tapes coupled with the StorageTek Automated Cartridge Systems, all of which are available from Storage Technology Corporation of Louisville, Colo.

Research Engine 18

Returning to FIG. 1, the system 10 further includes a research engine 18. The item capture research system 10 provides a variety of search options and provides access to the system through a variety of user interfaces, such as an IBM 3270 terminal or a graphical user interface of a personal computer. Preferably, transaction and image is available for up to seven years.

Figure 18:
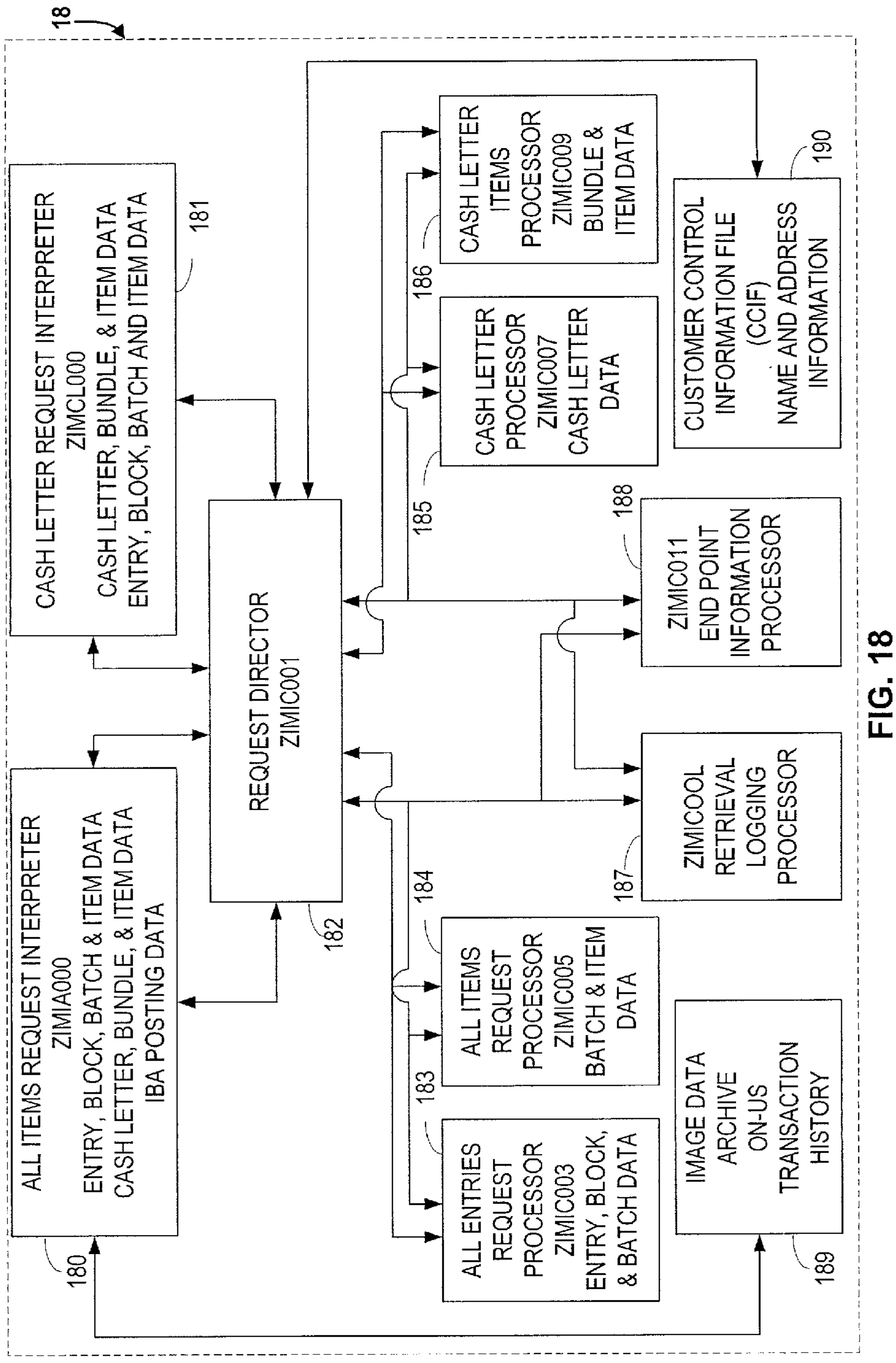
FIG. 18 is a diagram of the research engine of the item capture research system of the present invention.

FIG. 18 is a diagram of the components of the research engine 18. The research engine 18 supports two separate interfaces, an all items research interface and a cash letter items research interface.

To initiate a search of all items, the all items request interpreter 180 is initiated by the user. Similarly, to initiate a search of cash letter items, the cash letter request interpreter 181 is initiated by the user.

Once an interpreter is initiated, the user sends a research request to the request director 182 via either of the interpreters, 180 or 181. The request director 182 directs the research request to one of four request processors, which are discussed in more detail below.

If the research request is for entry, block or batch information, the request director 182 directs the research request to the all entries request processor 183. The all entries request processor 183 retrieves the requested information from the all entries master file (not shown), accumulates the requested entry, block or batch information and returns it to the all items request interpreter 180 via the request director 182.

If the research request is for a particular item, the request director 182 directs the research request to the all items request processor 184. The all items request processor 184 retrieves the requested item information from either the all items master file or the all items archive file (not shown), accumulates the requested item information and returns it to the all items request interpreter 180 via the request director 182.

If the research request is for cash letter information, the request director 182 directs the research request to the cash letter processor 185. The cash letter processor 185 retrieves the requested information from the cash letter master file (not shown), accumulates the requested cash letter information and returns it to the cash letter request interpreter 181 via the request director 182.

If the research request is for a particular bundle or cash letter item, the request director 182 directs the research request to the cash letter items processor 186. The cash letter items request processor 186 retrieves the requested information from either the bundle items master file or the bundle items archive file (not shown), accumulates the requested bundle or cash letter item information and returns it to the cash letter request interpreter 181 via the request director 182.

The retrieval logging processor 187 logs all of the transactions performed by the request processors, 183, 184, 185, 186. For example, the retrieval logging processor records user, start time of request, end time of request, processing time, number of records processed and number of records returned. Such information could be used for system administration or customer billing.

The end point information processor 188 provides detailed information about a cash letter from the end point master file (not shown), such as name, address, contact person and telephone number for the bank receiving a cash letter.

The image data archive 189 provides on-us transaction history information to the all items request interpreter 180.

The customer control information file 190 provides customer name and address information to either of the request interpreters 180 or 181 via the request director 182.

Maintenance Processing Module

The system collects information on items as they progress through the various phases of capture, posting and backend reporting. The information is stored within a single system that provides a variety of search options to users at all locations throughout the organization, which allows for quick retrieval (i.e., within seconds or minutes) of item data and the associated image.

Retrieval Processing Module

The system 10 also includes a retrieval processing module, which allows for search and retrieval of item and image information via traditional CICS screens and graphical user interfaces.

Figure 19:
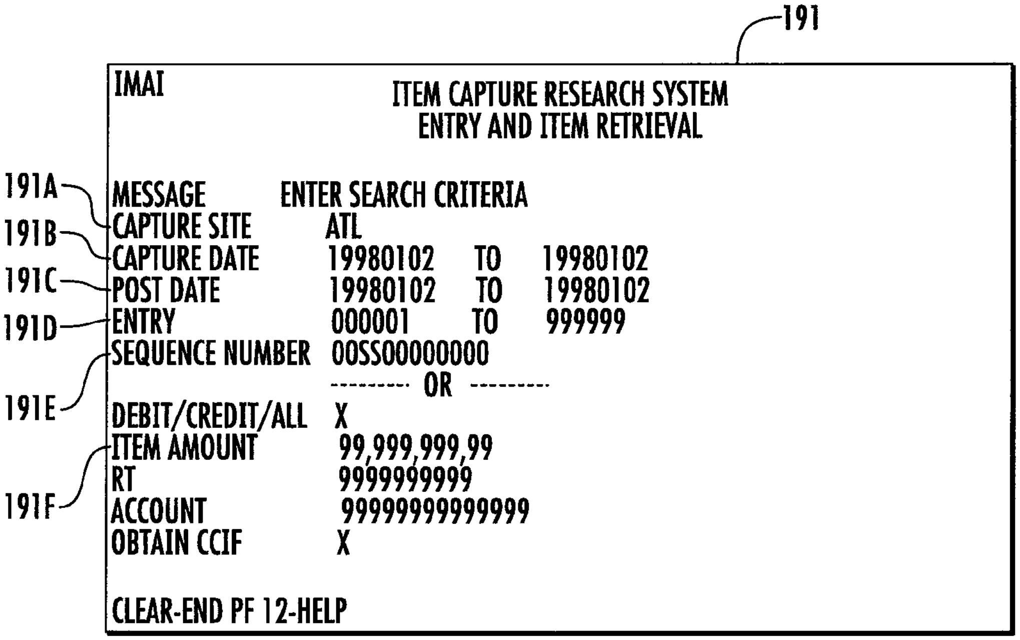
FIG. 19 is an illustration of the Entry and Item Retrieval Screen of the present invention.

The following entry and item CICS screens are provided for:

FIG. 19 is the Entry and Item Retrieval Screen 191. The Entry and Item Retrieval Screen 191 is used to initiate entry and item searches. The Capture Site 191A and Capture Date 191B range fields are required. The Post Date 191C range and Capture Date 191B range must be set to equal values if any of the item criteria is specified. The Entry 191D range, Sequence Number 191E, and Item Amount 191F fields are optional. The Entry Listing Screen 200 (FIG. 20) is returned if the search criteria yield multiple entries. The Specific Item Search Listing Screen 270 (FIG. 270) is returned if the Item Amount 191F criterion is specified and more than one item meets the search criteria. The On-Us Item Detail Screen 230 (FIG. 23) or the Transit Item Detail Screen 250 (FIG. 25) is returned if the Sequence Number 191E criteria is specified and a single item satisfies the search criteria.

FIG. 20 is the Entry Listing Screen 200. The Entry Listing Screen 200 can be used to either scroll through a list of entries or to selected additional information for a specific entry. The Block/Batch Listing Screen 210 (FIG. 21) is presented once the additional information for a specific entry is requested.

FIG. 21 is the Block/Batch Listing Screen 210. The Block/Batch Listing Screen 210 is used to either scroll through a list of batches or to selected additional information for a specific batch. The Block/Batch Detail Screen 220 is presented once the additional information for a specific batch is requested.

FIG. 22 is the Block/Batch Detail Screen 220. The Block/Batch Detail Screen 220 is used to either scroll through batch detail items or to select additional information for a specific item. The On-Us Item Detail Screen 230 or the Transit Item Detail Screen 250 is presented once the additional information for a specific item is requested.

FIG. 23 is the On-Us Item Detail Screen 230. The On-Us Item Detail Screen 230 is used to present detail information for a specific on-us item.

FIG. 24 is the On-Us Archive Item Detail Screen 240. The On-Us Archive Item Detail Screen 240 is used to present detail information for a specific on-us item.

FIG. 25 is the Transit Item Detail Screen 250. The Transit Item Detail Screen 250 is used to present additional information for a specific transit item.

FIG. 26 is the Transit Item Cash Letter Detail Screen 260. The Transit Item Cash Letter Detail Screen 260 is used to present additional information for a specific transit item.

FIG. 27 is the Specific Item Search Listing Screen 270. The Specific Item Search Listing Screen 270 is used to scroll though the items meeting the search criteria or to select additional information on a specific item. The On-Us Item Detail Screen 230 or the Transit Item Detail Screen 250 is presented once additional information for a specific item is requested.

FIG. 28 is the Specific Item Search Listing Screen 280 with CCIF data. The Specific Item Search Listing Screen 280 is used to scroll through the items meeting the search criteria or to select additional information on a specific item. The On-Us Item Detail Screen 230 or the Transit Item Detail Screen 250 is presented once additional information for a specific item is requested.

Figure 29:
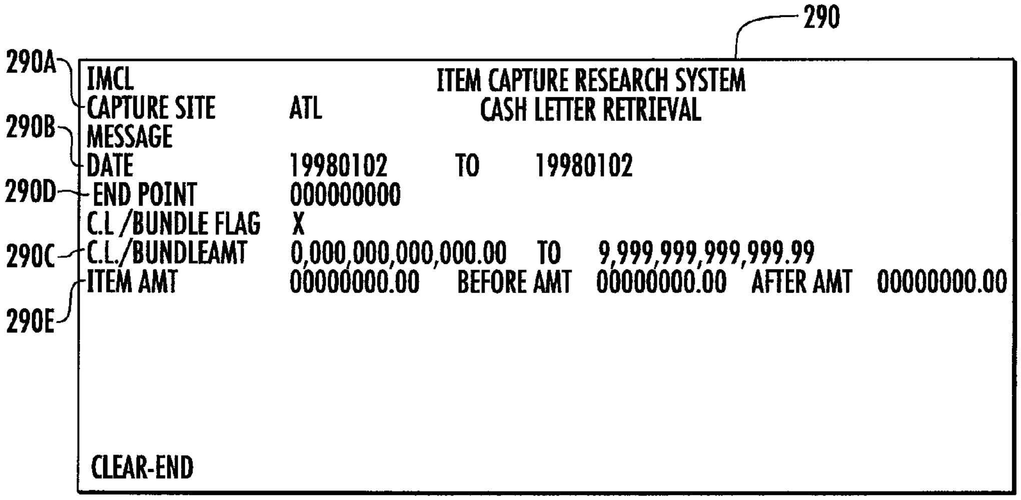
FIG. 29 is an illustration of the Cash Letter Retrieval Screen of the present invention.

The following cash letter CICS screens are provided for:

FIG. 29 is the Cash Letter Retrieval Screen 290. The Cash Letter Retrieval Screen 290 is used to initiate a cash letter search. The Capture Site 290A and Cash Letter Date 290B range fields are required. The Cash Letter Bundle Amount 290C range, End Point 290D, and Item Amount 290E range fields are optional. The Cash Letter Listing Screen 300 is returned if the Item Amount 290E search criteria is specified and a single item matches the search criteria.

FIG. 30 is the Cash Letter Listing Screen 300. The Cash Letter Listing Screen 300 is used either to scroll through a list of cash letters or to select additional information for a specific cash letter. The Cash Letter Bundle Listing Screen 310 (FIG. 31) is presented once the additional information for a specific cash letter is requested.

FIG. 31 is the Cash Letter Bundle Listing Screen 310. The Cash Letter Bundle Listing Screen 310 is used to scroll through a list of bundles or to select additional information for a specific bundle. The Cash Letter Bundle Detail Screen 330 is presented once the additional information for a specific bundle is requested.

FIG. 32 is the Bundle Listing Screen 320. The Bundle Listing Screen 320 is used to scroll through a list of bundles or to select additional information for a specific bundle. The Bundle Listing Screen 320 is presented for a bundle request by end point or bundle amount range. The Cash Letter Bundle Detail Screen 330 (FIG. 33) is presented once the additional information for a specific bundle is requested.

FIG. 33 is the Cash Letter Bundle Detail Screen 330. The Cash Letter Bundle Detail Screen 330 is used to scroll through bundle detail or to select additional information for a specific item within a bundle. The Cash Letter Bundle Detail Screen 330 is presented once the information for a specific bundle item is requested. An Item Amount 330A search is initiated by entering the Item Amount criteria.

FIG. 34 is the Cash Letter Item Detail Screen 340. The Cash Letter Item Detail Screen 340 is used to present additional information for a specific cash letter item.

FIG. 35 is the Cash Letter All Item Detail Screen 350. The Cash Letter All Item Detail Screen 350 is used to present additional information for a specific cash letter item.

The description of the preferred embodiments contained herein details the many ways the present invention can provide its intended purposes. While several preferred embodiments are described, it is apparent that various changes might be made without departing from the scope of the invention.

We claim:

1. An item capture research system, said system comprising:

(a) an item capture subsystem comprising a document processor and an image camera for capturing images and information from each of plurality of items each of which relates to a transaction, wherein the plurality of items are comprised of on-us items and cash letter items;

(b) an image archive subsystem comprising an on-us items image database for storing images of the captured on-us items and a cash letter items image database for storing images of the captured cash letter items; and (c) a transaction data archive subsystem for storing the information captured from the plurality of items, said transaction data archive subsystem having a multiple data structures, said multiple structures of said transaction data archive subsystem being comprised of: (i) an on-us items data structure, said on-us items data structure being further comprised of an on-us items archive file that is stored offline and an on-us items archive index, wherein the on-us items archive index is an index to the on-us items archive file and is stored online, (ii) an all items data structure, said all items data structure being further comprised of an all items archive file that is stored offline and an all items archive index, wherein the all items archive index is an index to the all items archive file and is stored online, and (iii) a cash letter items data structure, said cash letter items data structure being further comprised of a cash letter items archive file that is stored offline and a cash letter items archive index, wherein the cash letter items archive index is an index to the cash letter items archive file and is stored online; and (d) a research engine for receiving an item request, said item request comprising a request for information stored in the transaction data archive subsystem, and directing a response to the item request, said research engine comprising a request interpreter, a request director, and a request processor;

wherein on-us items are items that are drawn on a financial institution capturing the item, and cash letter items are items that are drawn on a financial institution other than a financial institution capturing the item.

2. The system of claim 1, wherein the on-us items data structure is further comprised of a plurality of credit transactions and a plurality of debit transactions.

3. The system of claim 2, further comprising an associator, wherein each of the plurality of credit transactions and debit transactions is associated with an account number via the associator.

4. The system of claim 3, wherein each of the plurality of credit transactions and debit transactions is comprised of MICR codeline data, a posted account number, a bank ID number and a posting date.

5. The system of claim 4, wherein the MICR codeline data for each of the plurality of credit transactions is comprised of an account number for an associated payee account, an amount and a credit account code.

6. The system of claim 5, wherein each of the plurality of credit transactions is associated with one or more corresponding debit transactions via the associator, and wherein each of the one or more corresponding debit transactions is associated with an account number associated with a payor account via the associator.

7. The system of claim 6, wherein the MICR codeline data for each of the plurality of credit transactions is further comprised of one or more additional data fields selected from the group consisting of a routing/transit number, a serial number and a process control field.

8. The system of claim 6, wherein each of the plurality of credit transactions is further comprised of at least one additional data field selected from the group consisting of a sequence number, transaction code and import source.

9. The system of claim 4, wherein the MICR codeline data for each of the plurality of debit transactions is comprised of a routing/transit number, an account number for the associated payor account and an amount.

10. The system of claim 9, wherein each of the plurality of debit transactions is associated with a corresponding credit transaction via the associator, and wherein each of the corresponding credit transactions is associated with an account number associated with a payee account via the associator.

11. The system of claim 10, wherein the MICR codeline data for each of the plurality of debit transactions is further comprised of at least one additional data field selected from the group consisting of a serial number and a process control field.

12. The system of claim 10, wherein each of the plurality of debit transactions is further comprised of at least one additional data field selected from the group consisting of a sequence number, transaction code and import source.

13. The system of claim 1, wherein the all items data structure is further comprised of a plurality of debit transactions.

14. The system of claim 13, wherein the MICR codeline data for each of the plurality of debit transactions is comprised of a routing/transit number, an account number for the associated payor account and an amount.

15. The system of claim 13 further comprising an associator, wherein each of the plurality of debit transactions is associated with a corresponding credit transaction via the associator, wherein each of the corresponding credit transactions is associated with an account number associated with a payee account via the associator.

16. The system of claim 15, wherein the MICR codeline data for each of the plurality of debit transactions is further comprised of at least one additional data field selected from the group consisting of a serial number and a process control field.

17. The system of claim 15, wherein each of the plurality of debit transactions is further comprised of at least one additional data field selected from the group consisting of a sequence number, transaction code and import source.

18. The system of claim 1, further comprising an associator, wherein the on-us items data structure is comprised of a plurality of transactions, wherein each of the plurality of transactions of the on-us items data structure is associated with a corresponding transaction stored in the all items data structure via the associator.

19. The system of claim 1, further comprising an associator, wherein the cash letter items data structure is comprised of a plurality of transactions, wherein each of the plurality of transactions of the cash letter items data structure is associated with a corresponding transaction stored in the all items data structure via the associator.

20. The system of claim 1, further comprising an associator, wherein each of the plurality of transactions of the cash letter items data structure is associated with a corresponding transaction stored in the on-us items data structure via the associator.

21. The system of claim 1, wherein the on-us items image database is comprised of a plurality of images, wherein the on-us items data structure is comprised of a plurality of transactions, wherein each of the plurality of images of the on-us items image database is associated with a corresponding one of the plurality of transactions of the on-us items data structure.

22. The system of claim 1, wherein the on-us items image database is comprised of a plurality of images, wherein the all items data structure is comprised of a plurality of transactions, wherein each of the plurality of images of the on-us items image database is associated with a corresponding one of the plurality of transactions of the all items data structure.

23. The system of claim 1, wherein the cash letter items image database is comprised of a plurality of images, wherein the cash letter items data structure is comprised of a plurality of transactions, wherein each of the plurality of images of the cash letter items image database is associated with a corresponding one of the plurality of transactions of the cash letter items data structure.

24. The system of claim 1, wherein the cash letter items image database is comprised of a plurality of images, wherein the all items data structure is comprised of a plurality of transactions, wherein each of the plurality of images of the cash letter items image database is associated with a corresponding one of the plurality of transactions of the all items data structure.

25. The system of claim 1, wherein said on-us items image database is comprised of a bank ID number, an account number, and an image date.

26. The system of claim 1, wherein said cash letter items image database is comprised of a sorter ID number, an image date, and a sequence number.

27. The system of claim 1, wherein said image data archive subsystem is further comprised of a white paper image database for storing images of white paper.

28. The system of claim 27, wherein said white paper image database is comprised of an account number and an image date.

29. The system of claim 1, wherein said image data archive subsystem is further comprised of an image data index.

30. The system of claim 29, wherein said image data index is comprised of an image date, a sorter ID number, a sorter cycle and a sequence number.

31. The system of claim 30, wherein said image data index is further comprised of a database identifier.

32. The system of claim 1, wherein the transaction is selected from the group consisting of an ATM transaction, a wire transaction, a phone access transaction, a debit card transaction and an online transaction.

33. The system of claim 1, wherein said request interpreter is an all items request interpreter and is used to search the all items data structure.

34. The system of claim 1, wherein said request interpreter is a cash letter request interpreter and is used to search the cash letter items data structure.

35. The system of claim 1, wherein said request director directs a search request to the request processor.

36. The system of claim 1, wherein said request processor is an all entries request processor.

37. The system of claim 1, wherein said request processor is an all items request processor.

38. The system of claim 1, wherein said request processor is a cash letter items request processor.

39. The system of claim 1, wherein said on-us items data structure is comprised of an on-us items file.

40. The system of claim 39, wherein said on-us items file is a VSAM file.

41. The system of claim 39, wherein said on-us items file is online.

42. The system of claim 1, wherein said on-us items archive file is comprised of MICR codeline data, a posted amount, a bank ID number, an account number and a posting date.

43. The system of claim 42, wherein said MICR codeline data is comprised of a routing/transit number, an account number and a serial number.

44. The system of claim 43, wherein said MICR codeline data is further comprised of a process control field.

45. The system of claim 1, wherein said on-us items archive file is further comprised of at least one additional data field selected from the group consisting of a sequence number, payee account number, transaction code and import source.

46. The system of claim 1, wherein said on-us items archive file is a VSAM file.

47. The system of claim 1, wherein said on-us items archive file is stored on magnetic tape.

48. The system of claim 1, wherein said on-us items archive index is a VSAM file.

49. The system of claim 1, wherein said on-us items archive index is stored on a DASD.

50. The system of claim 1, wherein said all items data structure is comprised of an all entries file.

51. The system of claim 50, wherein said all entries file is comprised of a capture site, a capture date, and an entry number.

52. The system of claim 51, wherein said entry number is further comprised of block information, the block information being comprised of a block sequence number and a block amount.

53. The system of claim 52, wherein said block information is further comprised of batch information, said batch information being comprised of a batch sequence number and a batch amount.

54. The system of claim 50, wherein said all entries file is a VSAM file.

55. The system of claim 50, wherein said all entries file is online.

56. The system of claim 50, wherein said all entries file is stored on a DASD.

57. The system of claim 50, wherein said all items data structure is further comprised of an all items file.

58. The system of claim 57, wherein said all items file is comprised of item information, said item information being comprised of MICR codeline data, an item amount, and an item sequence number.

59. The system of claim 57, wherein said all items file is a VSAM file.

60. The system of claim 57, wherein said all items file is online.

61. The system of claim 57, wherein said all items file is stored on a DASD.

62. The system of claim 1, wherein said all items archive file is comprised of item information, said item information being comprised of MICR codeline data, an item amount, and an item sequence number.

63. The system of claim 1, wherein said all items archive file is a VSAM file.

64. The system of claim 1, wherein said all items archive file is stored on magnetic tape.

65. The system of claim 1, wherein said all items archive index is a VSAM file.

66. The system of claim 1, wherein said all items archive index is stored on a DASD.

67. The system of claim 1, wherein said cash letter items data structure is comprised of a cash letter items file.

68. The system of claim 67, wherein said cash letter items file is comprised of an end point identifier, a cash letter date, a cash letter amount and a cash letter time.

69. The system of claim 67, wherein said cash letter items file is a VSAM file.

70. The system of claim 67, wherein said cash letter items file is stored on a DASD.

71. The system of claim 1, wherein said cash letter items data structure is further comprised of a bundle items file.

72. The system of claim 71, wherein said bundle items file is comprised of at least one bundle, wherein said at least one bundle is comprised of a bundle amount, a bundle time, and a bundle date.

73. The system of claim 72, wherein said at least one bundle is further comprised of at least one item, said at least one item being comprised of MICR codeline data and an item amount.

74. The system of claim 71, wherein said bundle items file is a VSAM file.

75. The system of claim 71, wherein said bundle items file is online.

76. The system of claim 71, wherein said bundle items file is stored on a DASD.

77. The system of claim 1, wherein said cash letter items data structure further includes a bundle items archive file.

78. The system of claim 77, wherein said bundle items archive file is comprised of at least one bundle, wherein said at least one bundle is comprised of a bundle amount, a bundle time, and a bundle date.

79. The system of claim 78, wherein said at least one bundle is further comprised of at least one item, said at least one item being comprised of MICR codeline data and an item amount.

80. The system of claim 77, wherein said bundle items archive file is a VSAM file.

81. The system of claim 77, wherein said bundle items archive file is offline.

82. The system of claim 77, wherein said bundle items archive file is stored on magnetic tape.

83. The system of claim 77, wherein said cash letter items data structure is further comprised of a bundles items archive index, wherein the bundle items archive index is an index to the bundle items archive file.

84. The system of claim 83, wherein said bundle items archive index is a VSAM file.

85. The system of claim 83, wherein said bundle items archive index is online.

86. The system of claim 83, wherein said bundle items archive index is stored on a DASD.

87. An item capture research method, said method comprising:

(a) capturing images and information from a plurality of items each of which relates to a transaction, wherein the plurality of items are comprised of on-us items and cash letter items;

(b) storing images of the captured on-us items in an on-us items image database and storing images of the captured cash letter items in a cash letter items image database; and (c) storing the information captured from the plurality of items in multiple data structures, said storing step being comprised of: (i) storing on-us items in an on-us items data structure, said on-us items data structure being further comprised of an on-us items archive file and an on-us items archive index, wherein the on-us items archive index is an index to the on-us items archive file, storing the on-us items archive file offline and storing the on-us items archive index online, (ii) storing all items in an all items data structure, said all items data structure being further comprised of an all items archive file and an all items archive index, wherein the all items archive index is an index to the all items archive file, storing the all items archive file offline and storing the all items archive index online, and (iii) storing cash letter items in a cash letter items data structure, said cash letter items data structure being further comprised of a cash letter items archive file and a cash letter items archive index, wherein the cash letter items archive index is an index to the cash letter items archive file, storing the cash letter items archive file offline and storing the cash letter items archive index online; and (d) receiving an item request, said item request comprising a request for information stored in step (c), and directing a response to the item request;

wherein on-us items are items that are drawn on a financial institution capturing the item, and cash letter items are items that are drawn on a financial institution other than a financial institution capturing the item.

88. The method of claim 87, further comprising storing a plurality of credit transactions and a plurality of debit transactions in the on-us items data structure.

89. The method of claim 88, further comprising associating each of the plurality of credit transactions and debit transactions with an account number.

90. The method of claim 89, further comprising instructions for storing MICR codeline data, a posted account number, a bank ID number and a posting date for each of the plurality of credit transactions and debit transactions.

91. The method of claim 90, further comprising storing MICR codeline data comprising an account number for an associated payee account, an amount and a credit account code for each of the plurality of credit transactions.

92. The method of claim 91, further comprising associating each of the plurality of credit transactions with one or more corresponding debit transactions, and associating each of the one or more corresponding debit transactions with an account number associated with a payor account.

93. The method of claim 92, further comprising storing MICR codeline data comprising one or more additional data fields selected from the group consisting of a routing/transit number, a serial number and a process control field for each of the plurality of credit transactions.

94. The method of claim 92, further comprising storing at least one additional data field selected from the group consisting of a sequence number, transaction code and import source for each of the plurality of credit transactions.

95. The method of claim 90, further comprising storing MICR codeline data comprising a routing/transit number, an account number for the associated payor account and an amount for each of the plurality of debit transactions.

96. The method of claim 95, further comprising associating each of the plurality of debit transactions with a corresponding credit transaction, and associating each of the corresponding credit transactions with an account number associated with a payee account.

97. The method of claim 96, further comprising storing MICR codeline date comprising at least one additional data field selected from the group consisting of a serial number and a process control field for each of the plurality of debit transactions.

98. The method of claim 96, further comprising storing at least one additional data field selected from the group consisting of a sequence number, transaction code and import source for each of the plurality of debit transactions.

99. The method of claim 87, further comprising storing a plurality of debit transactions in the all items data structure.

100. The method of claim 99, further comprising storing MICR codeline data comprising of a routing/transit number, an account number for the associated payor account and an amount for each of the plurality of debit transactions.

101. The method of claim 99, further comprising associating each of the plurality of debit transactions with a corresponding credit transaction, and associating each of the corresponding credit transactions with an account number associated with a payee account.

102. The method of claim 101, further comprising storing MICR codeline data comprising at least one additional data field selected from the group consisting of a serial number and a process control field with each of the plurality of debit transactions.

103. The method of claim 101, further comprising storing at least one additional data field selected from the group consisting of a sequence number, transaction code and import source for each of the plurality of debit transactions.

104. The method of claim 87, further comprising associating each of a plurality of transactions stored in the on-us items data structure with a corresponding transaction stored in the all items data structure.

105. The method of claim 87, further comprising associating each of a plurality of transactions of the cash letter items data structure with a corresponding transaction stored in the all items data structure.

106. The method of claim 87, further comprising associating each of a plurality of transactions of the cash letter items data structure with a corresponding transaction stored in the on-us items data structure.

107. The method of claim 87, further comprising associating each of the plurality of images of the on-us items image database with a corresponding one of the plurality of transactions of the on-us items data structure.

108. The method of claim 87, further comprising associating each of the plurality of images of the on-us items image database is with a corresponding one of the plurality of transactions of the all items data structure.

109. The method of claim 87, further comprising associating each of the plurality of images of the cash letter items image database with a corresponding one of the plurality of transactions of the cash letter items data structure.

110. The method of claim 87, further comprising associating each of the plurality of images of the cash letter items image database with a corresponding one of the plurality of transactions of the all items data structure.

111. The method of claim 87, further comprising storing a bank ID number, an account number, and an image date in said on-us items image database.

112. The method of claim 87, further comprising storing a sorter ID number, an image date, and a sequence number in said cash letter items image database.

113. The method of claim 87, further comprising storing images of white paper in a white paper image database.

114. The method of claim 113, further comprising storing an account number and an image date in said white paper image database.

115. The method of claim 87, further comprising providing an image data index.

116. The method of claim 115, further comprising storing an image date, a sorter ID number, a sorter cycle and a sequence number in said image data index.

117. The method of claim 116, further comprising storing a database identifier in said image data index.

118. The method of claim 87, further comprising storing a transaction selected from the group consisting of an ATM transaction, a wire transaction, a phone access transaction, a debit card transaction and an online transaction.

119. The method of claim 87, further comprising searching the all items data structure via said request interpreter comprising an all items request interpreter.

120. The method of claim 87, further comprising searching the cash letter items data structure via said request interpreter comprising a cash letter request interpreter.

121. The method of claim 87, further comprising directing a search request to the request processor via said request director.

122. The method of claim 87, further comprising processing a search request for all entries via said request processor comprising an all entries request processor.

123. The method of claim 87, further comprising processing a search request for all items via said request processor comprising an all items request processor.

124. The method of claim 87, further comprising processing a search request for cash letter items via said request processor comprising a cash letter items request processor.

125. The method of claim 87, further comprising storing on-us items in an on-us items file.

126. The method of claim 125, further comprising storing said on-us items file in a VSAM file.

127. The method of claim 125, further comprising storing said on-us items file online.

128. The method of claim 87, further comprising storing MICR codeline data, a posted amount, a bank ID number, an account number and a posting date in said on-us items archive file.

129. The method of claim 128, further comprising storing said MICR codeline data comprising of a routing/transit number, an account number and a serial number in said on-us items archive file.

130. The method of claim 129, further comprising storing said MICR codeline data comprising a process control field in said on-us items archive file.

131. The method of claim 87, further comprising storing at least one additional data field selected from the group consisting of a sequence number, payee account number, transaction code and import source in said on-us items archive file.

132. The method of claim 87, further comprising storing said on-us items archive file in a VSAM file.

133. The method of claim 87, further comprising storing said on-us items archive file on magnetic tape.

134. The method of claim 87, further comprising storing said on-us items archive index in a VSAM file.

135. The method of claim 87, further comprising storing said on-us items archive index on a DASD.

136. The method of claim 87, further comprising storing an all entries file in said all items data structure.

137. The method of claim 136, further comprising storing a capture site, a capture date, and an entry number in said all entries file.

138. The method of claim 137, further comprising storing block information, the block information being comprised of a block sequence number and a block amount, for an entry.

139. The method of claim 138, further comprising storing batch information, said batch information being comprised of a batch sequence number and a batch amount, for a block.

140. The method of claim 136, further comprising storing said all entries file in a VSAM file.

141. The method of claim 136, further comprising storing said all entries file online.

142. The method of claim 136, further comprising storing said all entries file on a DASD.

143. The method of claim 136, further comprising storing an all items file in said all items data structure.

144. The method of claim 143, further comprising storing item information, said item information being comprised of MICR codeline data, an item amount, and an item sequence number, in said all items file.

145. The method of claim 143, further comprising storing said all items file in a VSAM file.

146. The method of claim 143, further comprising storing said all items file online.

147. The method of claim 143, further comprising storing said all items file on a DASD.

148. The method of claim 87, further comprising storing item information, said item information being comprised of MICR codeline data, an item amount, and an item sequence number, in said all items archive file.

149. The method of claim 87, further comprising storing said all items archive file in a VSAM file.

150. The method of claim 87, further comprising storing said all items archive file on magnetic tape.

151. The method of claim 87, further comprising storing said all items archive index in a VSAM file.

152. The method of claim 87, further comprising storing said all items archive index on a DASD.

153. The method of claim 87, further comprising storing a cash letter items file in said cash letter items data structure.

154. The method of claim 153, further comprising storing an end point identifier, a cash letter date, a cash letter amount and a cash letter time in said cash letter items file.

155. The method of claim 153, further comprising storing said cash letter items file in a VSAM file.

156. The method of claim 153, further comprising storing said cash letter items file on a DASD.

157. The method of claim 87, further comprising storing a bundle items file in said cash letter items data structure.

158. The method of claim 157, further comprising storing at least one bundle, wherein said at least one bundle is comprised of a bundle amount, a bundle time, and a bundle date, in said bundle items file.

159. The method of claim 158, further comprising storing at least one item, said at least one item being comprised of MICR codeline data and an item amount, in said at least one bundle.

160. The method of claim 157, further comprising storing said bundle items file in a VSAM file.

161. The method of claim 157, further comprising storing said bundle items file online.

162. The method of claim 157, further comprising storing said bundle items file on a DASD.

163. The method of claim 87, further comprising storing a bundle items archive file in said cash letter items data structure.

164. The method of claim 163, further comprising storing at least one bundle, wherein said at least one bundle is comprised of a bundle amount, a bundle time, and a bundle date, in said bundle items archive file.

165. The method of claim 164, further comprising storing at least one item, said at least one item being comprised of MICR codeline data and an item amount, in said at least one bundle.

166. The method of claim 163, further comprising storing said bundle items archive file in a VSAM file.

167. The method of claim 163, further comprising storing said bundle items archive file offline.

168. The method of claim 163, further comprising storing bundle items archive file on magnetic tape.

169. The method of claim 163, further comprising storing a bundles items archive index, wherein the bundle items archive index is an index to the bundle items archive file, in said cash letter items data structure.

170. The method of claim 169, further comprising storing said bundle items archive index in a VSAM file.

171. The method of claim 169, further comprising storing said bundle items archive index online.

172. The method of claim 169, further comprising storing said bundle items archive index is on a DASD.

173. A computer program product encoded in one or more computer storage media for executing by a computer, the computer program product comprising instructions for:

(a) capturing images and information from a plurality of items each of which relates to a transaction, wherein the plurality of items are comprised of on-us items and cash letter items;

(b) storing images of the captured on-us items in an on-us items image database and storing images of the captured cash letter items in a cash letter items image database; and (c) storing the information captured from the plurality of items in multiple data structures, said storing step being comprised of: (i) storing on-us items in an on-us items data structure, said on-us items data structure being further comprised of an on-us items archive file and an on-us items archive index, wherein the on-us items archive index is an index to the on-us items archive file, storing the on-us items archive file offline and storing the on-us items archive index online, (ii) storing all items in an all items data structure, said all items data structure being further comprised of an all items archive file and an all items archive index, wherein the all items archive index is an index to the all items archive file, storing the all items archive file offline and storing the all items archive index online, and (iii) storing cash letter items in a cash letter items data structure, said cash letter items data structure being further comprised of a cash letter items archive file and a cash letter items archive index, wherein the cash letter items archive index is an index to the cash letter items archive file, storing the cash letter items archive file offline and storing the cash letter items archive index online; and (d) receiving an item request, said item request comprising a request for information stored in step (c), and directing a response to the item request;

wherein on-us items are items that are drawn on a financial institution capturing the item, and cash letter items are items that are drawn on a financial institution other than a financial institution capturing the item.

174. The computer program product of claim 173, further comprising instructions for storing a plurality of credit transactions and a plurality of debit transactions in the on-us items data structure.

175. The computer program product of claim 174, further comprising instructions for associating each of the plurality of credit transactions and debit transactions with an account number.

176. The computer program of claim 175, further comprising instructions for storing MICR codeline data, a posted account number, a bank ID number and a posting date for each of the plurality of credit transactions and debit transactions.

177. The computer program of claim 176, further comprising instructions for storing MICR codeline data comprising an account number for an associated payee account, an amount and a credit account code for each of the plurality of credit transactions.

178. The computer program of claim 175, further comprising instructions for associating each of the plurality of credit transactions with one or more corresponding debit transactions, and associating each of the one or more corresponding debit transactions with an account number associated with a payor account.

179. The computer program of claim 178, further comprising instructions for storing MICR codeline data comprising one or more additional data fields selected from the group consisting of a routing/transit number, a serial number and a process control field for each of the plurality of credit transactions.

180. The computer program of claim 178, further comprising instructions for storing at least one additional data field selected from the group consisting of a sequence number, transaction code and import source for each of the plurality of credit transactions.

181. The computer program of claim 176, further comprising instructions for storing MICR codeline data comprising a routing/transit number, an account number for the associated payor account and an amount for each of the plurality of debit transactions.

182. The computer program of claim 181, further comprising instructions for associating each of the plurality of debit transactions with a corresponding credit transaction, and associating each of the corresponding credit transactions with an account number associated with a payee account.

183. The computer program of claim 182, further comprising instructions for storing MICR codeline date comprising at least one additional data field selected from the group consisting of a serial number and a process control field for each of the plurality of debit transactions.

184. The computer program of claim 182, further comprising instructions for storing at least one additional data field selected from the group consisting of a sequence number, transaction code and import source for each of the plurality of debit transactions.

185. The computer program of claim 173, further comprising instructions for storing a plurality of debit transactions in the all items data structure.

186. The computer program of claim 185, further comprising instructions for storing MICR codeline data comprising of a routing/transit number, an account number for the associated payor account and an amount for each of the plurality of debit transactions.

187. The computer program of claim 185, further comprising instructions for associating each of the plurality of debit transactions with a corresponding credit transaction, and associating each of the corresponding credit transactions with an account number associated with a payee account.

188. The computer program of claim 187, further comprising instructions for storing MICR codeline data comprising at least one additional data field selected from the group consisting of a serial number and a process control field with each of the plurality of debit transactions.

189. The computer program of claim 187, further comprising instructions for storing at least one additional data field selected from the group consisting of a sequence number, transaction code and import source for each of the plurality of debit transactions.

190. The computer program of claim 173, further comprising instructions for associating each of a plurality of transactions stored in the on-us items data structure with a corresponding transaction stored in the all items data structure.

191. The computer program of claim 173, further comprising instructions for associating each of a plurality of transactions of the cash letter items data structure with a corresponding transaction stored in the all items data structure.

192. The computer program of claim 173, further comprising instructions for associating each of a plurality of transactions of the cash letter items data structure with a corresponding transaction stored in the on-us items data structure.

193. The computer program of claim 173, further comprising instructions for associating each of the plurality of images of the on-us items image database with a corresponding one of the plurality of transactions of the on-us items data structure.

194. The computer program of claim 173, further comprising instructions for associating each of the plurality of images of the on-us items image database is with a corresponding one of the plurality of transactions of the all items data structure.

195. The computer program of claim 173, further comprising instructions for associating each of the plurality of images of the cash letter items image database with a corresponding one of the plurality of transactions of the cash letter items data structure.

196. The computer program of claim 173, further comprising instructions for associating each of the plurality of images of the cash letter items image database with a corresponding one of the plurality of transactions of the all items data structure.

197. The computer program of claim 173, further comprising instructions for storing a bank ID number, an account number, and an image date in said on-us items image database.

198. The computer program of claim 173, further comprising instructions for storing a sorter ID number, an image date, and a sequence number in said cash letter items image database.

199. The computer program of claim 173, further comprising instructions for storing images of white paper in a white paper image database.

200. The computer program of claim 199, further comprising instructions for storing an account number and an image date in said white paper image database.

201. The computer program of claim 173, further comprising instructions for providing an image data index.

202. The computer program of claim 201, further comprising instructions for storing an image date, a sorter ID number, a sorter cycle and a sequence number in said image data index.

203. The computer program of claim 202, further comprising instructions for storing a database identifier in said image data index.

204. The computer program of claim 173, further comprising instructions for storing a transaction selected from the group consisting of an ATM transaction, a wire transaction, a phone access transaction, a debit card transaction and an online transaction.

205. The computer program of claim 173, further comprising instructions for searching the all items data structure via said request interpreter comprising an all items request interpreter.

206. The computer program of claim 173, further comprising instructions for searching the cash letter items data structure via said request interpreter comprising a cash letter request interpreter.

207. The computer program of claim 173, further comprising instructions for directing a search request to the request processor via said request director.

208. The computer program of claim 173, further comprising instructions for processing a search request for all entries via said request processor comprising an all entries request processor.

209. The computer program of claim 173, further comprising instructions for processing a search request for all items via said request processor comprising an all items request processor.

210. The computer program of claim 173, further comprising instructions for processing a search request for cash letter items via said request processor comprising a cash letter items request processor.

211. The computer program of claim 173, further comprising instructions for storing on-us items in an on-us items file.

212. The computer program of claim 211, further comprising instructions for storing said on-us items file in a VSAM file.

213. The computer program of claim 211, further comprising instructions for storing said on-us items file online.

214. The computer program of claim 173, further comprising instructions for storing MICR codeline data, a posted amount, a bank ID number, an account number and a posting date in said on-us items archive file.

215. The computer program of claim 214, further comprising instructions for storing said MICR codeline data comprising of a routing/transit number, an account number and a serial number in said on-us items archive file.

216. The computer program of claim 215, further comprising instructions for storing said MICR codeline data comprising a process control field in said on-us items archive file.

217. The computer program of claim 173, further comprising instructions for storing at least one additional data field selected from the group consisting of a sequence number, payee account number, transaction code and import source in said on-us items archive file.

218. The computer program of claim 173, further comprising instructions for storing said on-us items archive file in a VSAM file.

219. The computer program of claim 173, further comprising instructions for storing said on-us items archive file on magnetic tape.

220. The computer program of claim 173, further comprising instructions for storing said on-us items archive index in a VSAM file.

221. The computer program of claim 173, further comprising instructions for storing said on-us items archive index on a DASD.

222. The computer program of claim 173, further comprising instructions for storing an all entries file in said all items data structure.

223. The computer program of claim 222, further comprising instructions for storing a capture site, a capture date, and an entry number in said all entries file.

224. The computer program of claim 223, further comprising instructions for storing block information, the block information being comprised of a block sequence number and a block amount, for an entry.

225. The computer program of claim 224, further comprising instructions for storing batch information, said batch information being comprised of a batch sequence number and a batch amount, for a block.

226. The computer program of claim 222, further comprising instructions for storing said all entries file in a VSAM file.

227. The computer program of claim 222, further comprising instructions for storing said all entries file online.

228. The computer program of claim 222, further comprising instructions for storing said all entries file on a DASD.

229. The computer program of claim 222, further comprising instructions for storing an all items file in said all items data structure.

230. The computer program of claim 229, further comprising instructions for storing item information, said item information being comprised of MICR codeline data, an item amount, and an item sequence number, in said all items file.

231. The computer program of claim 229, further comprising instructions for storing said all items file in a VSAM file.

232. The computer program of claim 229, further comprising instructions for storing said all items file online.

233. The computer program of claim 229, further comprising instructions for storing said all items file on a DASD.

234. The computer program of claim 173, further comprising instructions for storing item information, said item information being comprised of MICR codeline data, an item amount, and an item sequence number, in said all items archive file.

235. The computer program of claim 173, further comprising instructions for storing said all items archive file in a VSAM file.

236. The computer program of claim 173, further comprising instructions for storing said all items archive file on magnetic tape.

237. The computer program of claim 173, further comprising instructions for storing said all items archive index in a VSAM file.

238. The computer program of claim 173, further comprising instructions for storing said all items archive index on a DASD.

239. The computer program of claim 173, further comprising instructions for storing a cash letter items file in said cash letter items data structure.

240. The computer program of claim 239, further comprising instructions for storing an end point identifier, a cash letter date, a cash letter amount and a cash letter time in said cash letter items file.

241. The computer program of claim 239, further comprising instructions for storing said cash letter items file in a VSAM file.

242. The computer program of claim 239, further comprising instructions for storing said cash letter items file on a DASD.

243. The computer program of claim 173, further comprising instructions for storing a bundle items file in said cash letter items data structure.

244. The computer program of claim 243, further comprising instructions for storing at least one bundle, wherein said at least one bundle is comprised of a bundle amount, a bundle time, and a bundle date, in said bundle items file.

245. The computer program of claim 244, further comprising instructions for storing at least one item, said at least one item being comprised of MICR codeline data and an item amount, in said at least one bundle.

246. The computer program of claim 243, further comprising instructions for storing said bundle items file in a VSAM file.

247. The computer program of claim 243, further comprising instructions for storing said bundle items file online.

248. The computer program of claim 243, further comprising instructions for storing said bundle items file on a DASD.

249. The computer program of claim 173, further comprising instructions for storing a bundle items archive file in said cash letter items data structure.

250. The computer program of claim 249, further comprising instructions for storing at least one bundle, wherein said at least one bundle is comprised of a bundle amount, a bundle time, and a bundle date, in said bundle items archive file.

251. The computer program of claim 250, further comprising instructions for storing at least one item, said at least one item being comprised of MICR codeline data and an item amount, in said at least one bundle.

252. The computer program of claim 249, further comprising instructions for storing said bundle items archive file in a VSAM file.

253. The computer program of claim 249, further comprising instructions for storing said bundle items archive file offline.

254. The computer program of claim 249, further comprising instructions for storing bundle items archive file on magnetic tape.

255. The computer program of claim 249, further comprising instructions for storing a bundles items archive index, wherein the bundle items archive index is an index to the bundle items archive file, in said cash letter items data structure.

256. The computer program of claim 255, further comprising instructions for storing said bundle items archive index in a VSAM file.

257. The computer program of claim 255, further comprising instructions for storing said bundle items archive index online.

258. The computer program of claim 255, further comprising instructions for storing said bundle items archive index is on a DASD.

* * * * *

UNITED STATES PATENT AND TRADEMARK OFFICE

CERTIFICATE OF CORRECTION

PATENT NO. : 7,363,290 B1     
APPLICATION NO. : 09/835791
DATED : April 22, 2008
INVENTOR(S) : Daniel et al.

It is certified that error appears in the above-identified patent and that said Letters Patent is hereby corrected as shown below:

On the Title page under item (56) "References Cited": The following US patent document should be included:

6,574,377 B1, 06/2003, Cahill, *et al.* .......................................... 382/305

Signed and Sealed this

Twentieth Day of January, 2009

JON W. DUDAS
*Director of the United States Patent and Trademark Office*